(12) United States Patent
Namba

(10) Patent No.: US 6,170,006 B1
(45) Date of Patent: *Jan. 2, 2001

(54) VIDEO ON DEMAND SERVICE SYSTEM FOR PERFORMING AUTOMATIC EXPANDING PROCESSING OF DATA AND TITLE INFORMATION

(75) Inventor: Takaaki Namba, Inuyama (JP)

(73) Assignee: Matsushita Electric Industrial Co., Ltd., Osaka-Fu (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/122,658

(22) Filed: Jul. 27, 1998

(30) Foreign Application Priority Data

| Jul. 29, 1997 | (JP) | 9-203582 |
| Sep. 11, 1997 | (JP) | 9-247018 |
| Jul. 21, 1998 | (JP) | 10-205551 |

(51) Int. Cl.[7] .................................................. H04N 7/10
(52) U.S. Cl. .......................... 709/217; 348/7; 714/114
(58) Field of Search ........................ 348/7, 714, 10, 348/12; 415/4.2, 4.1; 345/327, 328; 209/217–219; 714/111, 114, 147, 148

(56) References Cited

U.S. PATENT DOCUMENTS

| 4,914,571 | 4/1990 | Baratz et al. . |
| 5,809,239 | * 9/1998 | Dan et al. ............................. 348/7 |
| 5,890,203 | * 3/1999 | Aoki ..................................... 348/7 |
| 5,905,847 | * 5/1999 | Kobayashi et al. ................. 348/7 |

FOREIGN PATENT DOCUMENTS 8-18938 1/1996 (JP) .

* cited by examiner

Primary Examiner—Victor R. Kostak
(74) Attorney, Agent, or Firm—Wenderoth, Lind & Ponack, L.L.P.

(57) ABSTRACT

A video server is interconnected through a LAN and the like to other video servers, allowing data transmission/reception among the video servers. Users are connected through a network to a server managing portion. The server managing portion receives access from the users to make an instruction to the video server. An access amount managing portion manages an access amount of the video server to determine whether to perform expanding processing of a VOD service. When the expanding processing is to be performed, a data copy processing portion checks an amount in the other video server, and copies data to the other video servers as required. Then, the server managing portion distributes access processing.

It is thus possible to improve expandability of the VOD service as to data and the like to which a large amount of access is made in the video server, allowing the availability of a comfortable VOD service system to the users.

18 Claims, 20 Drawing Sheets

FIG. 11

| VIDEO SERVER / INFORMATION | STATION A₁ | | | |
|---|---|---|---|---|
| | VIDEO SERVER 11 | VIDEO SERVER 12 | VIDEO SERVER 13 | |
| DISK SPACE | 20% | 60% | 80% | |
| THE NUMBER OF ACCESS USERS | 20 | 50 | 100 | |
| ⋮ | ⋮ | ⋮ | ⋮ | |

FIG. 17

| VIDEO SERVER / STORAGE LOCATION | STATION A1 | | | |
|---|---|---|---|---|
| | VIDEO SERVER 11 | VIDEO SERVER 12 | VIDEO SERVER 13 | ---- |
| ADDRESS 001 | | MOVIE X | PLAY V | ---- |
| ADDRESS 002 | | SPORT Y | | ---- |
| ADDRESS 003 | MOVIE W | | MOVIE X | ---- |
| ADDRESS 004 | DRAMA Z | DRAMA Z | | ---- |
| ⋮ | ⋮ | ⋮ | ⋮ | |

SERVER MANAGING PORTION
OF STATION A₁
SERVER MANAGING PORTION
OF STATION A₂
TITLE MENU SCREEN G1
TITLE MENU SCREEN G2
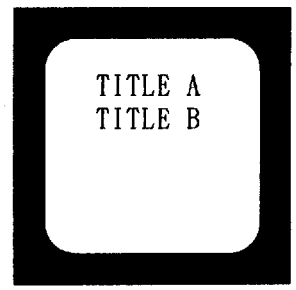
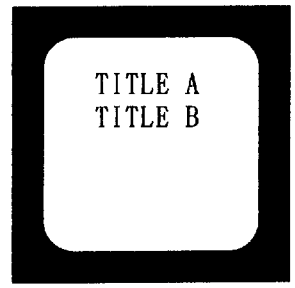
FIG. 18a
FIG. 18a'
VIDEO SERVER
 TITLE B DELETED
 TITLE C, D ADDED
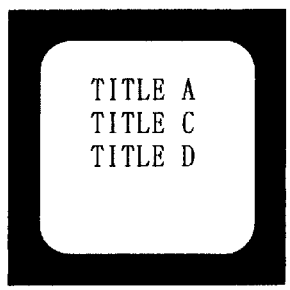
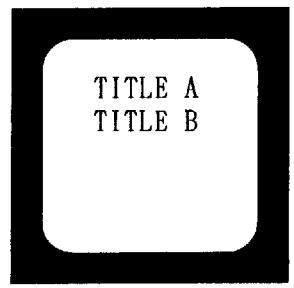
FIG. 18b
FIG. 18b'
TRANSMIT CHANGE
NOTIFICATION TO
OTHER STATION
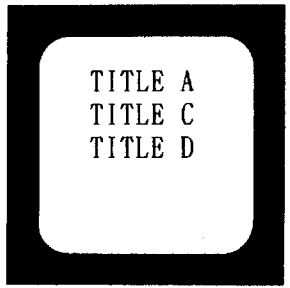
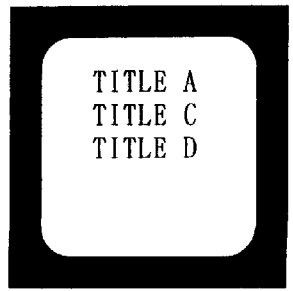
FIG. 18c
FIG. 18c'

F I G. 20

| INFORMATION / VIDEO SERVER | | STATION A1 | | | |
|---|---|---|---|---|---|
| | | VIDEO SERVER 11 | VIDEO SERVER 12 | VIDEO SERVER 13 | |
| STORAGE LOCATION | ADDRESS 001 | | MOVIE X | PLAY V | |
| | ADDRESS 002 | | SPORT Y | | |
| | ADDRESS 003 | MOVIE W | | MOVIE X | |
| | ADDRESS 004 | DRAMA Z | DRAMA Z | | |
| | ⋮ | ⋮ | ⋮ | ⋮ | |
| DISK SPACE | | 20% | 60% | 80% | |
| THE NUMBER OF ACCESS USERS | | 20 | 50 | 100 | |
| | | ⋮ | ⋮ | ⋮ | |

VIDEO ON DEMAND SERVICE SYSTEM FOR PERFORMING AUTOMATIC EXPANDING PROCESSING OF DATA AND TITLE INFORMATION

BACKGROUND OF THE INVENTION

1. Field of the Invention

This invention relates to video on demand (VOD) service systems, and more specifically to, in a system where a plurality of video servers are interconnected on a network, a video service system in which a video server is provided with automatic expandability and a video server and a method used for the system, and a recording medium of recording a computer program to execute the method.

2. Description of the Background Art

A VOD service system is a system in which a video server storing a picture file or data (hereinafter simply referred to as data) and a user terminal are connected through a network and the video server receives a view request of arbitrary pictures (hereinafter referred to as access) from a user through the user terminal to promptly provide the pictures to which the view request is made for the user.

Generally, even if a plurality of video servers are interconnected through a network, a certain data item is stored only in any one of the video servers. Here, in these video servers, an amount capable of accepting access is determined by their capacities.

Therefore, when accesses center on data which is stored only in a specific video server (for example, when accesses center on a popular movie, sport and the like), the load of processing is put only on the video server. Further, when the concentrated accesses exceed the acceptable amount of the above video server, the access cannot be received in such a way that the video server rejects the accesses exceeding the acceptable amount.

In order to cope with the problem, a system using a method of broadcast sending has been suggested. The broadcast sending method is a method for accumulating accesses to the same data for an arbitrary time period and performing processing to a plurality of accesses in that time period after the lapse of the time simultaneously and in parallel.

As a system with a method used by switching a provision by the above broadcast sending and a provision by normal transmission, a system is disclosed in Japanese Patent Laying-Open No. 8-18938 (hereinafter referred to as a first reference). In the method disclosed in the above first reference, first (when the number of accesses is one), data is provided for an access origin by a supplying method by normal transmission, and when other accesses to the same data follow, by switching to the broadcast sending from the time, the data is also provided for the other access origins.

On the other hand, as described above, a certain data item is stored only in any one of the video servers. Therefore, when the corresponding data is not stored in a specific video server to which the user accesses, it is required to search all of the other video servers except the specific video server connected on the network for a video server in which the corresponding data is stored.

As a video server searching method, "LOCATING RESOURCES IN COMPUTER NETWORKS" disclosed in U.S. Pat. No. 4,914,571 (hereinafter referred to as a second reference) is known.

However, in the searching method disclosed in the above second reference, when the corresponding data exists only in a video server at a distant location requiring a lot of transmission time, response capabilities to users become deteriorated. Further, in the searching method disclosed in the above second reference, when the corresponding data does not exist in any of the video servers on the network (due to data updating and the like), searches of the entire network will result, causing a problem that a response to the access (a response that no data to which a view request is made exists) cannot be transmitted within a system-guaranteed time in a wide area network.

Therefore, the system using the searching method disclosed in the above second reference may disadvantageously impair the characteristic of the VOD service system that a user can see pictures whenever the/she wants.

In order to cope with the problem, a system has been developed such that each video server holds and manages information about a title and a storage location of data stored in each video server (hereinafter referred to as title information). By this system, it is possible to quickly determine in which video server the data corresponding to the access by the user is stored, allowing a prompt response to the access from the user.

The above title information is provided for the user terminals of the VOD service system as a title menu.

However, as described above, in the conventional general VOD service system, when accesses center on a specific video server to exceed the acceptable amount of the video server, some users disadvantageously cannot make accesses.

Further, in the system using the broadcast sending method, since it is required to wait for an arbitrary time period, the time of use for the user is restricted and the characteristic of the VOD service system may be disadvantageously impaired as such that a user can see pictures whenever he/she wants.

Further, in the system disclosed in the above first reference, data is provided from some midpoint for the access except the first access.

On the other hand, in the above system using a method of holding and managing the title information, when a new data item is added or a stored data item is deleted, the specific video server to which addition/deletion is made updates its own title information, while the other video servers are not notified of the update contents in the specific video server and therefore do not update the title information.

Therefore, the user who is connected to the other video servers accesses based on the old title information without being updated. Thus, the user may disadvantageously receive the service without knowing the existence of added data and access data which has been already deleted.

SUMMARY OF THE INVENTION

Therefore, an object of the present invention is to provide a VOD service system capable of providing a comfortable VOD service for users without impairing a characteristic of the VOD service system by improving expandability of data among video servers and title information as to the data, a video server and a method used for the system, and a recording medium for recording a computer program to execute the method.

The present invention has the following features to achieve the object described above.

A first aspect is directed to a VOD service system in which a plurality of video servers and a plurality of user terminals are connected through a network, the system for receiving access from the user terminals and then providing data stored in the video server for the user terminals, each of the video servers comprising:
  access amount managing means for managing an amount of the access from the user terminals; and
  data copy processing means for copying specific data to at least one other video server when the access amount managing means determines that the amount of the access exceeds a predetermined amount.

As described above, in accordance with the first aspect, the video server manages the amount of access of its own, and copies specific data to another video server when the amount of access exceeds the predetermined amount.

Therefore, in the first aspect, even when accesses center only on a specific video server, the system is automatically expanded, and thus it is possible to provide a comfortable VOD service to more users without rejecting access due to an exceeded acceptable amount or giving restriction on transmission timing to the users.

According to a second aspect, the data copy processing means in the first aspect transmits notification of a request for copy permission of the specific data to the at least one video server, and further receives a response of copy permission or prohibition to the notification from the at least one other video server to determine whether it is possible to copy the specific data.

As described above, in accordance with the second aspect, the data copy processing means in the first aspect copies the specific data after receiving permission from another video server.

Therefore, in the second aspect, it is possible to select another video server which has more remaining capacity for access to copy the specific data, thereby allowing the availability of a more comfortable VOD service.

According to a third aspect, the data copy processing means in the second aspect does not copy the specific data when the response to the notification does not arrive after a lapse of a predetermined time from transmission of the notification of the request for copy permission.

As described above, in accordance with the third aspect, in the second aspect, when no response arrives after a lapse of the predetermined time from transmission of the request for copy permission to another video server, it is determined that a copy is prohibited.

Therefore, in the third aspect, it is possible not to take time more than required for expanding processing, and a problem of having an effect on other access processing being handled already can be avoided.

A fourth aspect is directed to a VOD service system in which a plurality of video servers and a plurality of user terminals are connected through server managing means by a network, the system for receiving access from the user terminals and then providing data stored in the video server for the user terminals, the server managing means comprising access amount managing means for instructing the video server relating to access from the user terminals and further manages an access amount of all of the plurality of video servers, each of the video servers comprising data copy processing means for copying the specific data to at least one other video server arbitrarily determined by the access amount managing means when the access amount managing means determines that the amount of the access to the video server exceeds a predetermined amount.

As described above, in accordance with the fourth aspect, the server managing means performs centralized management of the access amount of all video servers, and copies the specific data to another video server when the amount of access of the video server exceeds the predetermined amount.

Therefore, in the fourth aspect, even when accesses center only on a specific video server, the system is automatically expanded, and thus it is possible to quickly provide a comfortable VOD service to more users without rejecting access due to an exceeded acceptable amount or giving restriction on transmission timing to the users.

According to a fifth aspect, the access amount managing means in the third aspect further comprises a function for distributing access processing to the specific data to the at least one other video server.

According to a sixth aspect, the access amount managing means in the fourth aspect further comprises a function for distributing access processing to the specific data to the at least one other video server.

As described above, in accordance with the fifth and sixth aspects, the access amount managing means in the third and fourth aspects comprises a function for access distribution processing as to the copied specific data.

Therefore, in the fifth and sixth aspects, not related access after copy of the specific data, but related access which has now been handled is quickly distributed, and thus it is possible to quickly provide a more comfortable VOD service.

A seventh aspect is directed to a VOD service system in which a plurality of stations structured of at least one video server and server managing means for managing title information corresponding to data stored in the at least one video server are interconnected through a network, the system for receiving access from user terminals connected to the stations through a network and then providing the data stored in the video server to the user terminals, the server managing means comprising:
  title managing means for changing the title information according to a change request from the video server of its own station; and
  title publication processing means for informing the server managing means of another station of changes of the title information as to the video server which makes the change request.

According to an eighth aspect, in the seventh aspect, the title publication processing means creates change notification based on the changes of the title information and then transmits the change notification to the server managing means of another station.

According to a ninth aspect, in the eighth aspect, when receiving the change notification from the server managing means of another station, the title publication processing means informs the title managing means of a change request of the title information based on the change notification.

As described above, in accordance with the seventh to ninth aspects, when data changes such as addition/deletion occur in the specific video server, all of the server managing means connected through the network are notified of the changes to be made to change the title information.

Therefore, in the seventh to ninth aspects, it is possible to provide updated title information also for the user terminals connected to the other stations, allowing the availability of a comfortable VOD service to the users without impairing the characteristic of the VOD system.

According to a tenth aspect, in the ninth aspect, when receiving the change notification from the server managing means of the other station, title publication processing means creates response notification according to change processing of the title information performed by the title managing means and then transmits the response notification to the server managing means of the other station.

According to an eleventh aspect, in the tenth aspect, based on the response notification from the server managing means of the other station, the title publication processing means manages a state of changes of the title information in the server managing means of the other station.

As described above, in accordance with the tenth and eleventh aspects, the server managing means which received the change notification is adapted to return a response whether changes are made or not to the server managing means which transmitted the change notification.

Therefore, in the tenth and eleventh aspects, it is possible for the station which transmitted the change notification to know the state of changes of the title information in the other station.

According to a twelfth aspect, in the eleventh aspect, the title publication processing means restricts time capable of receiving the response notification to the transmitted change notification.

As described above, in accordance with the twelfth aspect, in the eleventh aspect, the time capable of receiving the response notification is restricted.

Therefore, in the twelfth aspect, when no response notification arrives within a predetermined time, it is possible to determine that the station has some failure.

A thirteenth aspect is directed to a video server for use in a VOD service system for receiving access from a user terminal and then providing corresponding data, comprising:

access amount managing means for managing an amount of the access from the user terminal; and data copy processing means for copying the specific data to at least one other video server when the access amount managing means determines that the amount of the access exceeds a predetermined amount.

As described above, in accordance with the thirteenth aspect, the video server manages the amount of access of its own, and copies the specific data to another video server when the amount of access exceeds the predetermined amount.

Therefore, in the thirteenth aspect, when the VOD service system is constructed and accesses centers only on a specific video server, the system is automatically expanded, and thus it is possible to provide a comfortable VOD service to more users without rejecting access due to an exceeded acceptable amount or giving restriction on transmission timing to the users.

According to a fourteenth aspect, in the thirteenth aspect, the data copy processing means transmits notification of request for copy permission of the specific data to the at least one other video server, and further receives a response of copy permission or prohibition to the notification from the at least one other video server to determine whether it is possible to copy the specific data.

As described above, in accordance with the fourteenth aspect, the data copy processing means in the thirteenth aspect copies the specific data after receiving permission from another video server.

Therefore, in the fourteenth aspect, on construction of the VOD service system, it is possible to select the other video server which has more remaining capacity for access to copy the specific data, allowing the availability of a more comfortable VOD service.

According to a fifteenth aspect, in the fourteenth aspect, the data copy processing means does not copy the specific data when the response to the notification does not arrive after a lapse of a predetermined time from transmission of the notification of the request for copy permission.

As described above, in accordance with the fifteenth aspect, in the fourteenth aspect, when no response arrives after a lapse of the predetermined time from transmission of the request for copy permission to another video server, it is determined that copy is prohibited.

Therefore, in the fifteenth aspect, on construction of the VOD service system, it is possible not to take more time than required for expanding processing, and a problem of having an effect on other access processing being handled already can be avoided.

A sixteenth aspect is directed to a video server for use in a VOD service system for receiving access from a user terminal and then providing corresponding data, comprising:

title managing means for, according to changes of stored data, changing title information as to the data; and title publication processing means for informing another video server of the changes.

According to a seventeenth aspect, in the sixteenth aspect, the title publication processing means creates change notification based on the changes of the title information and then transmits the change notification to the other video server.

According to an eighteenth aspect, in the seventeenth aspect, when receiving the change notification from the other video server, the title publication processing means informs the title managing means of a change request of the title information based on the change notification.

As described above, in accordance with the sixteenth to eighteenth aspects, when data changes such as addition/deletion occur in a specific video server, all of the other server managing means connected through the network are informed of the changes to be made to change the title information.

Therefore, the sixteenth to eighteenth aspects, on construction of the VOD service system, it is possible to provide updated title information also for the user terminals connected to the other stations, allowing the making available of a comfortable VOD service to the users without impairing the characteristic of the VOD system.

According to a nineteenth aspect, in the eighteenth aspect, when receiving the change notification from the other video server, the title publication processing means creates response notification according to change processing of the title information performed by the title managing means and then transmits the response notification to the other video server.

According to a twentieth aspect, in the nineteenth aspect, based on the response notification from the other video server, the title publication processing means manages a state of changes of the title information in the other video server.

As described above, in accordance with the nineteenth and twentieth aspects, the server managing means which received the change notification is adapted to return a response indicating whether or not changes are made to the server managing means which transmitted the change notification.

Therefore, in the nineteenth and twentieth aspects, on construction of the VOD service system, it is possible for the station which transmitted the change notification to know the state of changes of the title information in the other station.

According to a twenty-first aspect, in the twentieth aspect, the title publication processing means restricts time capable of receiving the response notification to the transmitted change notification.

As described above, in accordance with the twenty-first aspect, in the twentieth aspect, the time capable of receiving the response notification is restricted.

Therefore, in the twenty-first aspect, on construction of the VOD service system, when no response notification arrives within a predetermined time, it is possible to determine that the station has some failure.

A twenty-second aspect is directed to a data processing method in a VOD service system in which a plurality of video servers and a plurality of user terminals are connected through a network, the system for receiving access from the user terminals and then providing data stored in the video server for the user terminals, comprising the steps of:

managing an amount of the access from the user terminal;

making a request for copy permission of specific data to at least one other video server when it is determined in the managing step that the amount of the access exceeds a predetermined amount; and copying the specific data based on a response of copy permission or prohibition to the request received from the at least one other video server.

As described above, in accordance with the twenty-second aspect, the amount of access of the video server is managed, and when the amount of access exceeds the predetermined amount, the specific data is copied to the other video server after permission.

Therefore, in the twenty-second aspect, even when accesses center only on a specific video server, another video server which has more remaining capacity for access is automatically selected to expand the system, and it is possible to provide a comfortable VOD service to more users without rejecting access due to an exceeded acceptable amount or giving restriction on transmission timing to the users.

According to a twenty-third aspect, in the twenty-second aspect, the copying step does not copy the specific data when the response to the request does not arrive after a lapse of a predetermined time from transmission of the request for copy permission.

As described above, in accordance with the twenty-third aspect, in the twenty-second aspect, when no response arrives after a lapse of the predetermined time from transmission of the request for copy permission to another video server, it is determined that copy is prohibited.

Therefore, in the twenty-third aspect, it is thereby possible not to take more time than required for expanding processing, and a problem of having an effect on other access processing being handled already can be avoided.

A twenty-fourth aspect is directed to a title managing method in a VOD service system in which a plurality of stations structured of at least one video server and server managing means for managing title information corresponding to data stored in the at least one video server are interconnected through a network, the system for receiving access from user terminals connected to the stations through a network and then providing the data stored in the video server to the user terminals, the server managing means comprising the steps of:

changing the title information according to a change request from the video server of its own station;

informing the server managing means of the other station of changes of the title information as to the video server which makes the change request; and when receiving the notification, changing the title information according to the notification.

As described above, in accordance with the twenty-fourth aspect, when data changes such as addition/deletion occur, all of the server managing means connected through the network are notified of the changes to be made to change the title information.

Therefore, in the twenty-fourth aspect, it is possible to provide updated title information also for the user terminals connected to the other stations, allowing the availability of a comfortable VOD service to the users without impairing the characteristic of the VOD system.

A twenty-fifth aspect is directed to a data restoring method in a VOD service system in which a plurality of stations structured of at least one video server and server managing means for managing title information corresponding to data stored in the at least one video server are interconnected through a network, the system for receiving access from user terminals connected to the stations through a network and providing the data stored in the video server for the user terminals, the method comprising the steps of:

copying data stored in the video server to at least one other video server;

changing the title information of each of the stations according to processing in the copying step; and changing the title information of the stations according to data changes stored in the arbitrary video server; wherein when restoration of stored data in the specific video server is required, the specific video server can restore the data by copying corresponding data based on any one of the title information.

As described above, in accordance with the twenty-fifth aspect, since each station performs data expanding processing as well as title information expanding processing, each station has the title information always corresponding to the contents of each video server.

Therefore, in the twenty-fifth aspect, even when an arbitrary video server is out of order and the like to require restoration, it is possible to automatically perform restoring processing only by copying corresponding data based on any one of the title information in any one of the stations.

A twenty-sixth aspect is directed to a recording medium of recording a computer program executed in a VOD service system in which a plurality of video servers and a plurality of user terminals are connected through a network, the system for, on receiving access from the user terminals, providing data stored in the video server for the user terminals, the computer program being for realizing an operating environment comprising the steps of:

managing an amount of the access from the user terminal;

making request for copy permission of specific data to at least one other video server when it is determined in the managing step that the amount of access exceeds a predetermined amount; and copying the specific data based on a response of copy permission or prohibition to the request received from the at least one other video server.

According to a twenty-seventh aspect, in the twenty-sixth aspect, the copying step does not copy the specific data when the response to the request does not arrive after a lapse of a predetermined time from transmission of the request for copy permission.

A twenty-eighth aspect is directed to a recording medium of recording a computer program executed in a VOD service system in which a plurality of stations structured of at least one video server and server managing means for managing title information corresponding to data stored in the at least one video server are interconnected through a network, the system for receiving access from user terminals connected to the stations through a network and then providing the data stored in the video server to the user terminals, the computer program being for realizing an operating environment comprising the steps of, in the server managing means:

changing the title information according to a change request from the video server of its own station;

informing the server managing means of the other station of changes of the title information as to the video server which makes the change request; and when receiving the notification, changing the title information according to the notification.

As described above, the twenty-sixth to twenty-eighth aspects are directed to recording mediums of recording a computer program for executing the data processing method and the title managing method in the twenty-second to twenty-fourth aspects, respectively. The twenty-sixth to twenty-eighth aspects are adapted to supply an arbitrary VOD service system with the data processing method and the title managing method in the twenty-second to twenty-fourth aspects in a software form.

These and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a diagram showing an example of data information included in an access amount managing portion 42 in FIG. 9;

FIG. 17 is a diagram showing an example of title information included in a server managing portion 41 in FIG. 13 has;

FIGS. 18a to 18c and 18a' to 18c' are screen examples showing changes of title menu screens when data expanding processing in the third embodiment of the present invention is performed;

FIG. 20 is a diagram showing an example of data/title information included in the server managing portion 41 in FIG. 13.

DESCRIPTION OF THE PREFERRED EMBODIMENTS (First embodiment)

A first embodiment of the present invention is a VOD service system which improves data expandability among video servers.

Figure 1:
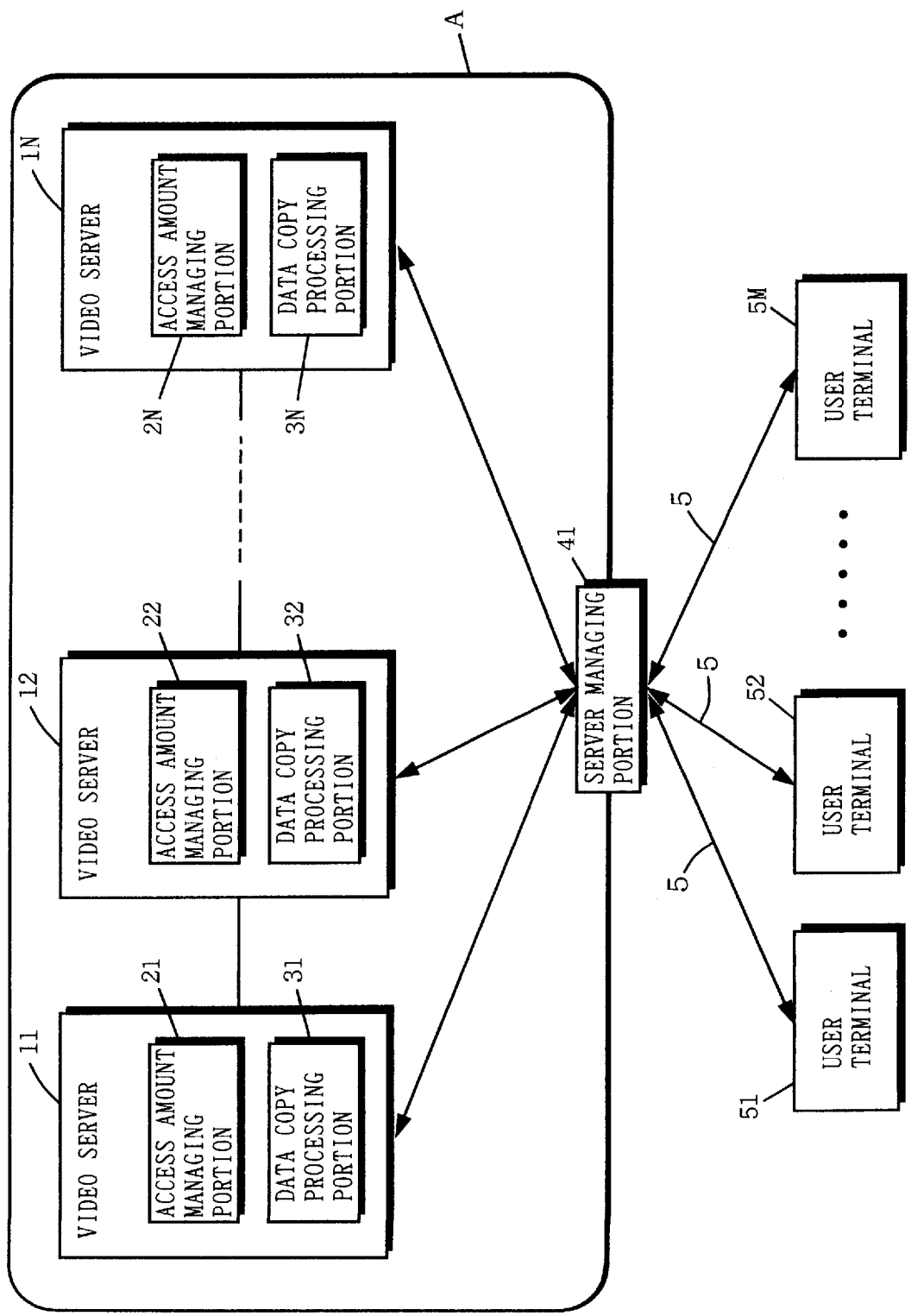
FIG. 1 is a block diagram showing the structure of a VOD service system according to a first embodiment of the present invention.

FIG. 1 is a diagram showing the structure of the VOD service system according to the first embodiment of the present invention. In FIG. 1 the VOD service system according to the first embodiment of the present invention is composed of a plurality of video servers 11 to 1N (N is an integer not less than 2; ditto for the following), and a server managing portion 41, and a plurality of user terminals 51 to 5M (M is an integer not less than 2; ditto for the following).

Further, the plurality of video servers 11 to 1N each includes access amount managing portions 21 to 2N and data copy processing portion 31 to 3N.

Practically, in addition to the above components, the plurality of video server 11 to 1N have various components such as a write processing portion for storing data, a read processing portion for transmitting data requested by a user, a control portion for controlling transmission timing, and the like. However, since they are not a main subject of the invention, their description is omitted herein.

Further, practically, the server managing portion 41 has various components such as a read processing portion for requesting the video server to transmit a title requested by a user and the like. However, since they are not a main subject of the invention, their description is omitted herein.

Further, since all of the plurality of video servers 11 to 1N have the same structure, the following description is made mainly as to the video server 11.

The video server 11 stores and transmits data as required. Further, the video server 11 is interconnected to other video servers 12 to 1N through a local area network (LAN) or a wide area network (WAN) (hereinafter referred to as LAN and the like), thereby allowing an exchange of data among the video servers 11 to 1N. The plurality of user terminals 51 to 5M are connected through a network 5 to the server managing portion 41. The server managing portion 41 is, for example, such as a menu server, receiving access from the plurality of user terminals 51 to 5M and making instructions to the respective video servers 11 to 1N. The access amount managing portion 21 manages the amount of access of the video server 11 to determine whether to perform automatic expanding processing of the VOD service which will be described below. When the access amount managing portion 21 determines to perform the expanding processing, the data copy processing portion 31 checks the amount in the other video servers 12 to 1N (both the amount of access and disk space) and then copies data to the other video servers 12 to 1N as required.

In the following description, a portion structured of the video servers 11 to 1N and the server managing portion 41 is referred to as a station A.

Figure 2:
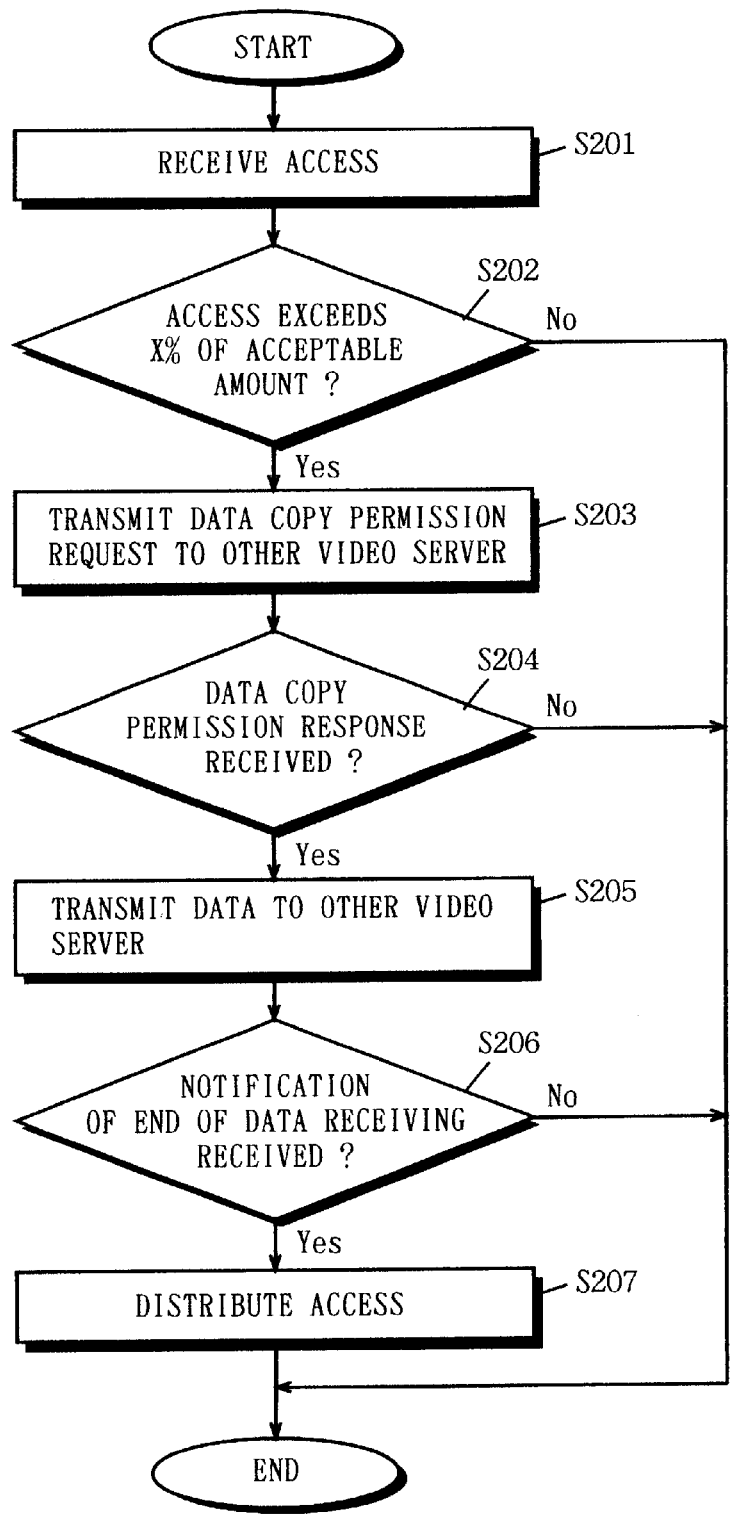
FIG. 2 is a flow chart showing a flow of expanding processing performed by video servers 11 to 1N in FIG. 1.

Described below is an expanding processing operation automatically performed by the video server in the VOD service system with the above structure according to the first embodiment of the present invention using FIG. 2. FIG. 2 is a flow chart showing the expanding processing automatically performed by the video server. In the following description, the flow of the processing is shown in a case where the video server 11 automatically performs the expanding processing to the video server 12, as an example.

The video server 11 receives access from the server managing portion 41 as normal (step S201). Upon receiving the access, the access amount managing portion 21 determines whether the total number of accesses held at present exceeds X% of an acceptable amount for access processing of the video server 11 (step S202). X is a real number not less than 0 and less than 100 arbitrarily set according to a system, and, for example, it is set to an amount over which increases of the access processing results in nearly overwork of the video server 11. As a result of the determination in step S202, when the total number of accesses exceeds X% of the acceptable amount, the access amount managing portion 21 instructs the data copy processing portion 31 to perform the expanding processing. In response to the instruction, the data copy processing portion 31 transmits a data copy permission request in order to confirm that data copy responding to the accesses which exceed the acceptable amount is permitted (step S203).

After transmitting the data copy permission request in step S203, the data copy processing portion 31 determines whether there is a response of permission or prohibition from the video server 12 with respect to the transmitted data copy permission request (step S204). In the determination in step S204, when the response of permitting data copy is received from the video server 12 (that is, when there is space available in the video server 12), the data copy processing portion 31 transmits applicable data to the video server 12 (step S205).

After transmitting the applicable data to the video server 12, the data copy processing portion 31 determines whether it is notified by the video server 12 of an end of data receiving (step S206). In the determination in step S205, when receiving notification from the video server 12 of an end of data receiving, the data copy processing portion 31 notifies the access amount managing portion 21 that the data has been copied properly.

Then, the access amount managing portion 21 distributes part of (or the whole) access processing as to the copied data which the video server 11 handles (that is, the video server 11 puts a load of its own access processing on the video server 12 of a data copy destination) (step S207). However, access distribution is not necessarily required, and depending on the setting of the above-mentioned X%, a method may be taken that the video server 12 of the data copy destination is made to first perform processing to access which is subsequently received.

On the other hand, when the total number of accesses does not exceed X% of the acceptable amount in step S202, and when the data copy processing portion 31 receives a response of prohibition from the video server 12 in step S204 (that is, there is no space available in the video server) or does not receive notification of an end of data receiving from the video server 12 in step S206 (due to, for example, LAN impairment and the like), the access amount managing portion 21 does not perform access distribution, that is, the expanding processing.

When data transmission and the like cannot be performed directly to a desired video server due to LAN impairment and the like, it may be possible to once copy data to another normally operating video server, and then transfer the copy to the desired video server therefrom.

Described above is the flow of the automatic expanding processing, and described in detail below are permission/prohibition of data copy and transmitting/receiving of data in the data copy processing portion 31 in steps S203 to S206, and the like using FIG. 3.

Figure 3:
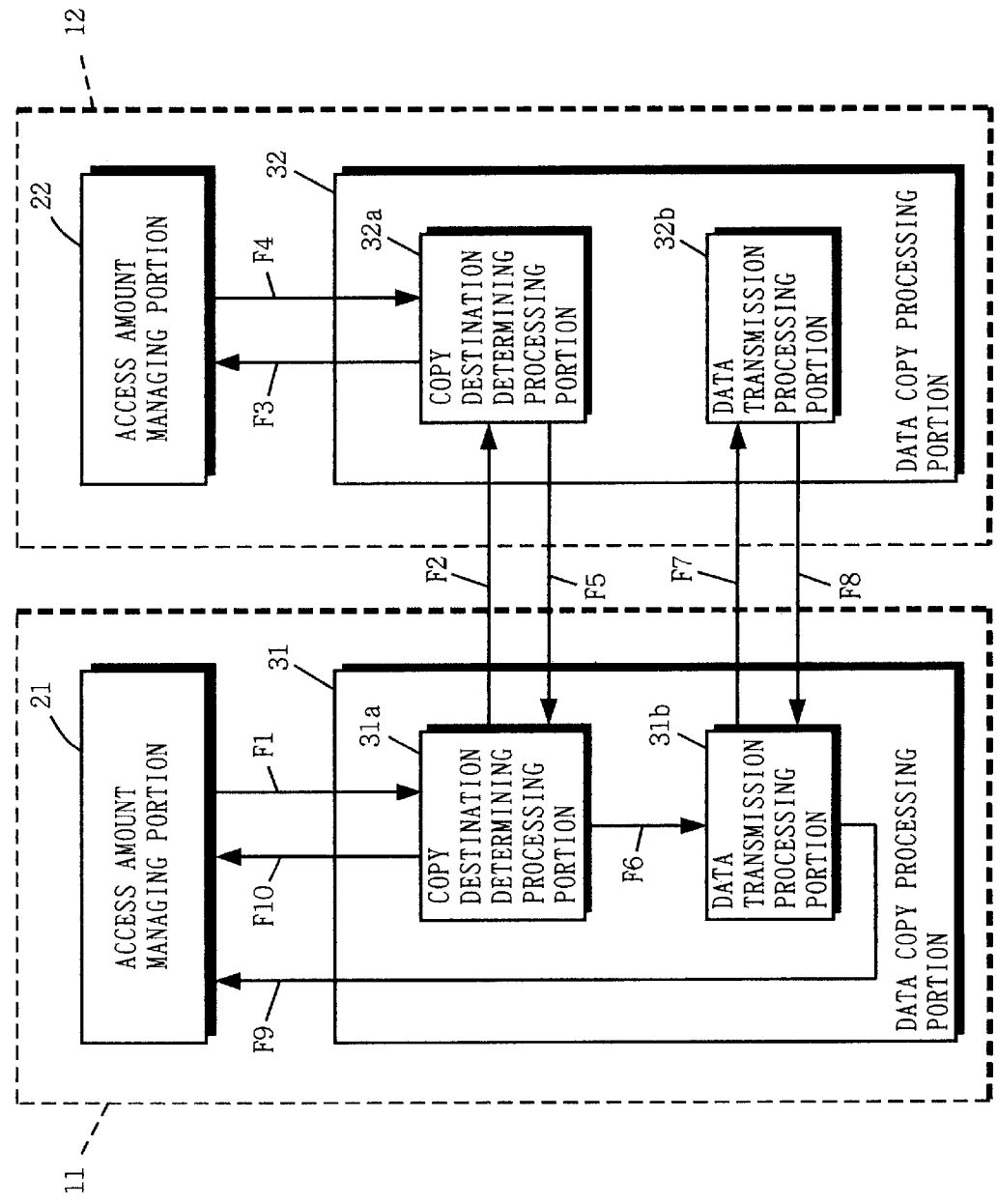
FIG. 3 is a diagram showing an example of flow of processing performed in the video server 11 and with another video server 12.

FIG. 3 shows a flow of processing performed in the video servers 11 and 12 when the video server 11 automatically performs the expanding processing to the video server 12. In FIG. 3, the data copy processing portions 31 and 32 include copy destination determining processing portions 31a and 32a and data transmission processing portions 31b and 32b, respectively.

First, when the data copy processing portion 31 is instructed to perform the expanding processing by the access amount managing portion 21 (F1), the copy destination determining processing portion 31a transmits a data copy permission request to the copy destination determining processing portion 32a of another video server 12 (F2). In order to determine whether to accept the request, the copy destination determining processing portion 32a requests the access amount managing portion 22 to check the amount (F3). As a result of the above check, when obtaining a result of approving the copy request from the access amount managing portion 22 (F4), the copy destination determining processing portion 32a transmits a response of permitting data copy to the copy destination determining processing portion 31a (F5). After receiving this response, the copy destination determining processing portion 31a informs the data transmission processing portion 31b of permission of data transmission (F6). Upon receiving the information, the data transmission processing portion 31b transmits the applicable data to the data transmission processing portion 32b (F7). After receiving the entire transmitted data, the data transmission processing portion 32b notifies the data transmission processing portion 31b of an end of data receiving (F8). Upon receiving notification of an end of data receiving from the data transmission processing portion 32b, the data transmission processing portion 31b informs the access amount managing portion 21 that data copy processing ended (F9).

On the other hand, when receiving a result of disapproving the copy request from the access amount managing portion 22 (F4), the copy destination determining processing portion 32a transmits a response of prohibiting data copy to the copy destination determining processing portion 31a (F5). Upon receiving this response of prohibition, the copy destination determining processing portion 31a informs the access amount managing portion 21 that data copy cannot be performed (F10).

Figure 4:
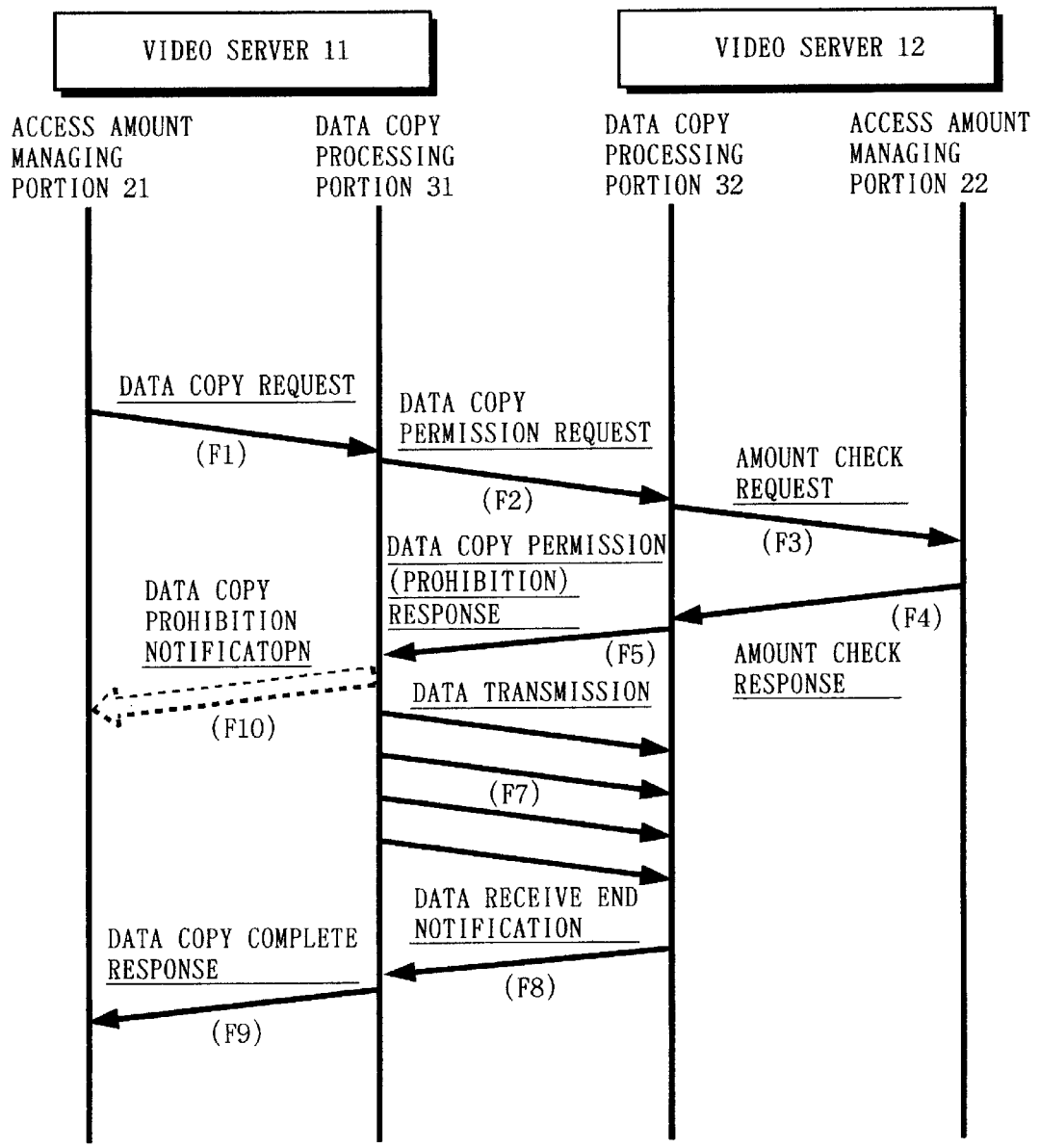
FIG. 4 is a diagram showing a flow of processing in FIG. 3 as a sequence.

A sequence of the processing described above is shown in FIG. 4.

In the description of the flow chart in FIG. 2, described is a one-to-one processing in which the video server 11 performs the expanding processing to the video server 12. However, the expanding processing according to the first embodiment is not limited to the one-to-one processing, and it is possible to perform a one-to-multiple processing to the all remaining video servers 13 to 1N connected through the LAN and the like in the station A. In this case, the access processing is distributed to the plurality of other video servers 13 to 1N, allowing a further reduction in processing loads on the video server 11 whose access amount exceeds X%.

Figure 5:
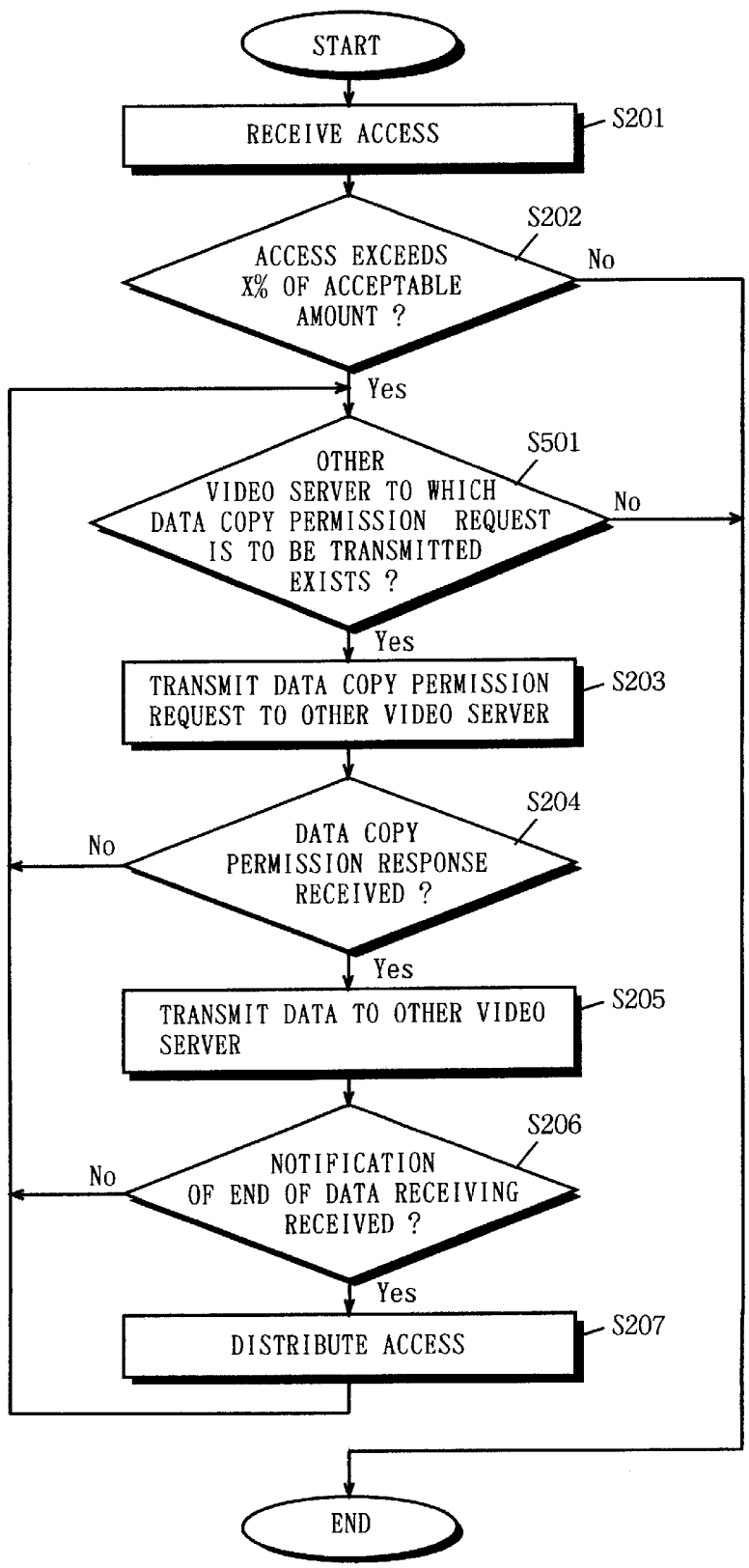
FIG. 5 is another flow chart showing expanding processing performed by the video servers 11 to 1N in FIG. 1.
Figure 6:
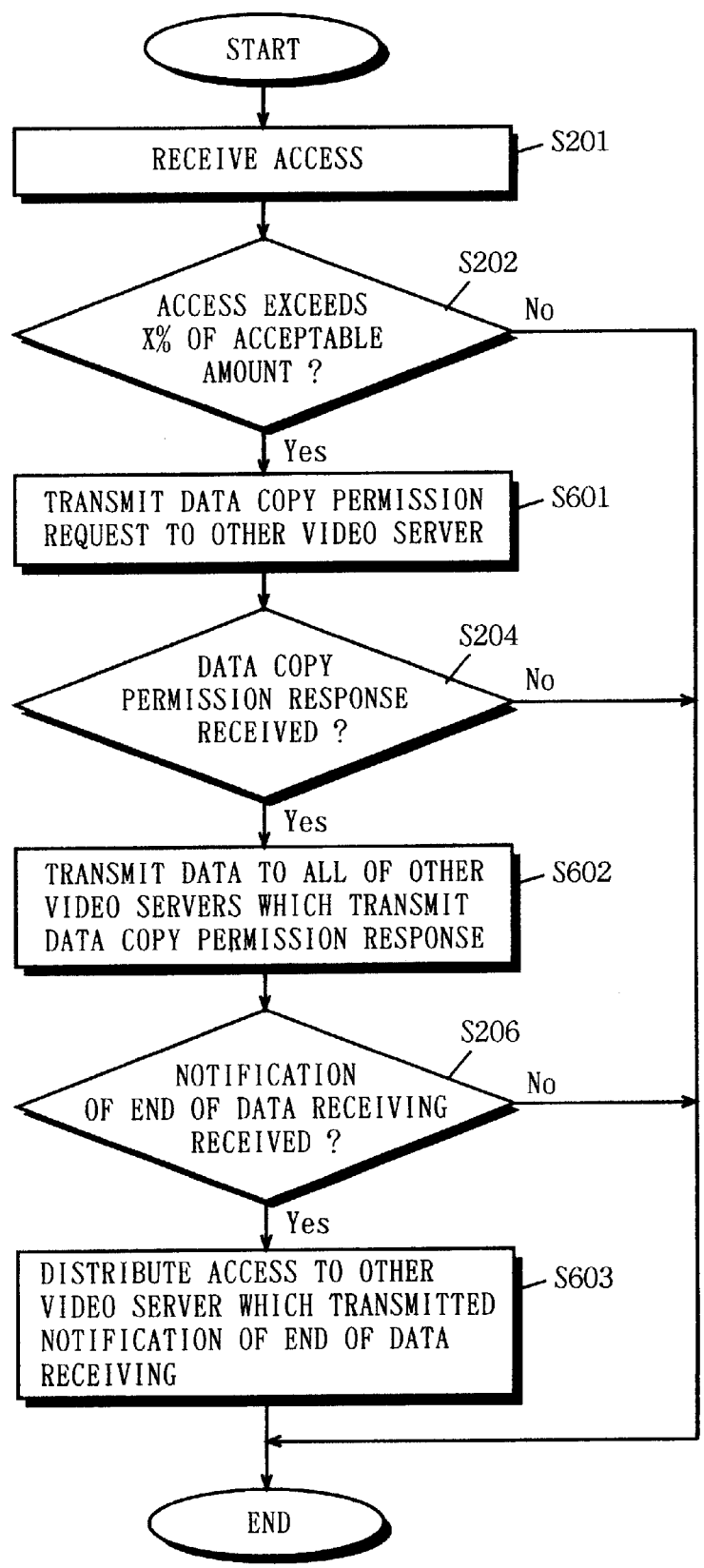
FIG. 6 is another flow chart showing expanding processing performed by the video servers 11 to 1N in FIG. 1.

Flow charts showing a flow of processing when the expanding processing is performed to the above plurality of video servers 12 to 1N are shown in FIG. 5 and FIG. 6. In FIG. 5 and FIG. 6, the processing whose step number is the same as that shown in FIG. 2 has the same contents as those in FIG. 2.

In the expanding processing shown in FIG. 5, before transmitting a data copy permission request to another video server (step S203), it is determined whether there is another video server to which the data copy permission request should be transmitted (and has not been transmitted) (step S501). Then, when one flow of the access distribution processing ends (step S207), the processing returns to step S501. This allows the expanding processing to all of the other video servers 12 to 1N in the station A.

Further, in the expanding processing shown in FIG. 6, the data copy permission request is transmitted from the beginning to all of the other video servers 12 to 1N (step S601). Then, the data is transmitted only to a video server which transmits a response of permission to the data copy permission request (step S602). Further, after that, the access distribution processing is performed only to a video server which sends notification of an end of data receiving as to data transmission (step S603). Therefore, it is possible to quickly perform the expanding processing to all of the other video servers 12 to 1N in the station A at one time.

Further, the VOD service system is, as described above, a system for quickly providing requested pictures in response to access from a user. Therefore, the advantages of the VOD service system will be impaired if it takes too much time to perform the expanding processing and the user who makes a request is kept waiting. Furthermore, using capabilities only for the expanding processing may have an effect on the processing with respect to other accesses being handled already.

Figure 7:
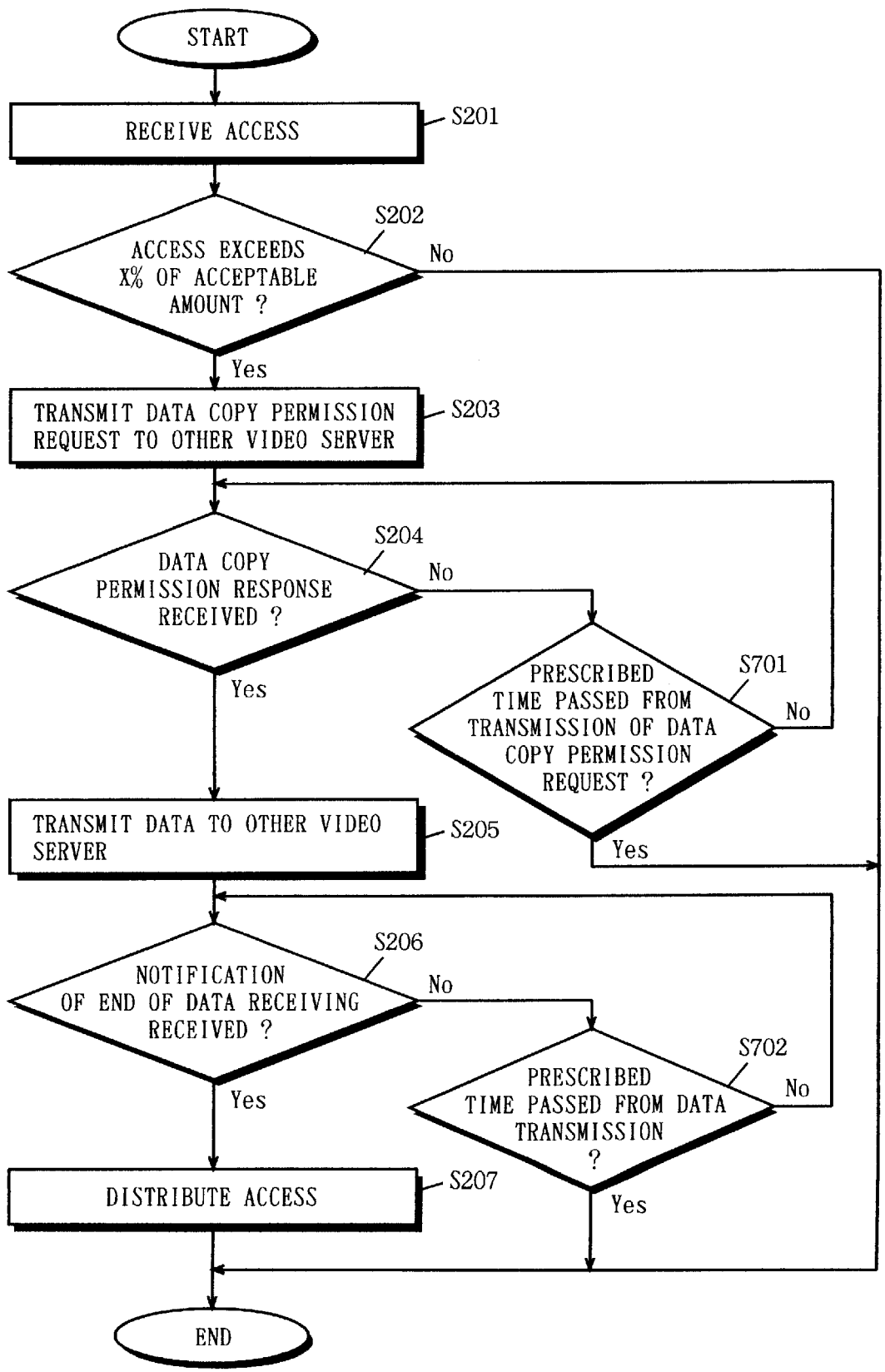
FIG. 7 is another flow chart showing expanding processing performed by the video servers 11 to 1N in FIG. 1.

It is expanding processing shown in FIG. 7 that copes with the above problems. The expanding processing shown in FIG. 7 is processing obtained by providing the expanding processing shown in FIG. 2 with a step for determining a lapse of time. The time for use in this determination is, for example, time in which the expanding processing performed by the video server 11 of a copy source does not have an effect on other access processing being handled already, and the like. In FIG. 7, when a response to the data copy permission request in step S204 is not transmitted after a lapse of predetermined a time, the expanding processing is ended. (step S701). Furthermore, when notification of an end of data receiving as to data transmission is not transmitted after a lapse of the predetermined time, the expanding processing is ended (step S702). It is thereby possible not to take more time than required for the expanding processing, and concerns of having an effect on other access processing being handled already are cleared.

This limitation on the expanding processing by time can be similarly used for the expanding processing shown in FIG. 5 and FIG. 6.

Further, instead of determining whether there is notification of an end of data receiving in step S206, it is possible to start the access processing distribution based on a lapse of time from data transmission in step S205 or S602.

Further, in step S204 in the expanding processing shown in FIG. 5 and FIG. 6, the data copy permission response is provided with information of the remaining acceptable amount, allowing the copy source video server to arbitrary select a video server with a large amount of space and then make data copy.

As described above, before the access processing capacities of the video servers 11 to 1N are exceeded, the VOD service system according to the first embodiment of the present invention copies the data of presently received access to the other video servers 11 to 1N and distributes the access processing to the copy destination video servers 11 to 1N.

Therefore, the VOD service in accordance with the first embodiment can previously avoid problems such as that the video servers 11 to 1N are overworked to reject access.

Figure 8:
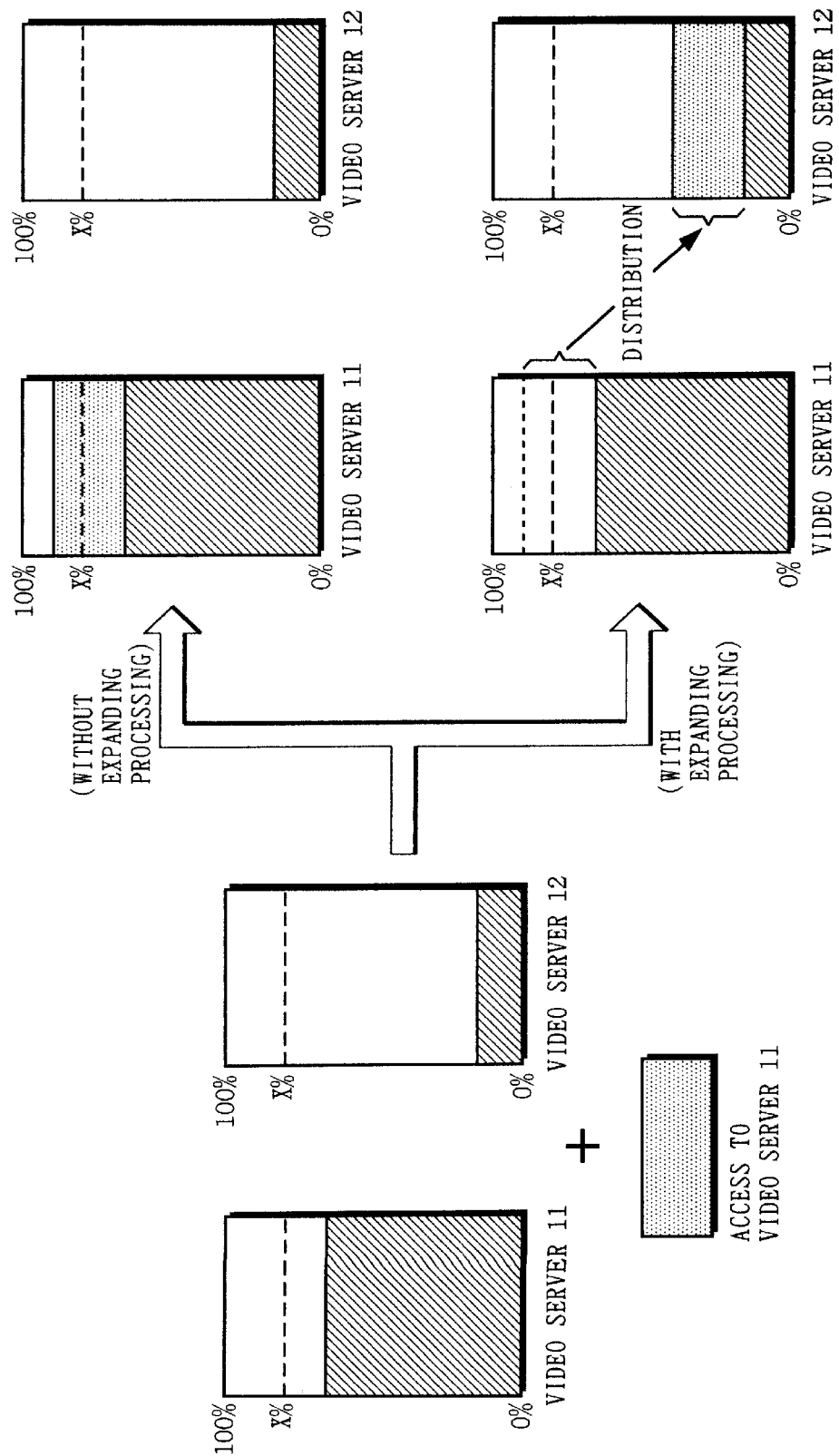
FIG. 8 is a diagram showing differences of states of the video servers between when the data expanding processing in the first embodiment of the present invention is performed and when it is not performed.

FIG. 8 conceptually represents differences of states of the video servers between when the expanding processing is performed and when not performed.

In the VOD service system according to the first embodiment of the present invention, the plurality of video servers 11 to 1N and the plurality of user terminals 51 to 5M are connected through the server managing portion 41. However, when performing the expanding processing according to the present invention, the VOD service system according to the first embodiment of the present invention may have a structure in which the plurality of video servers 11 to 1N and the plurality of user terminals 51 to 5M are directly connected, not through the server managing portion 41.

(Second embodiment)

Like the above described first embodiment, a second embodiment of the present invention is a VOD service system which improves data expandability among video servers.

Figure 9:
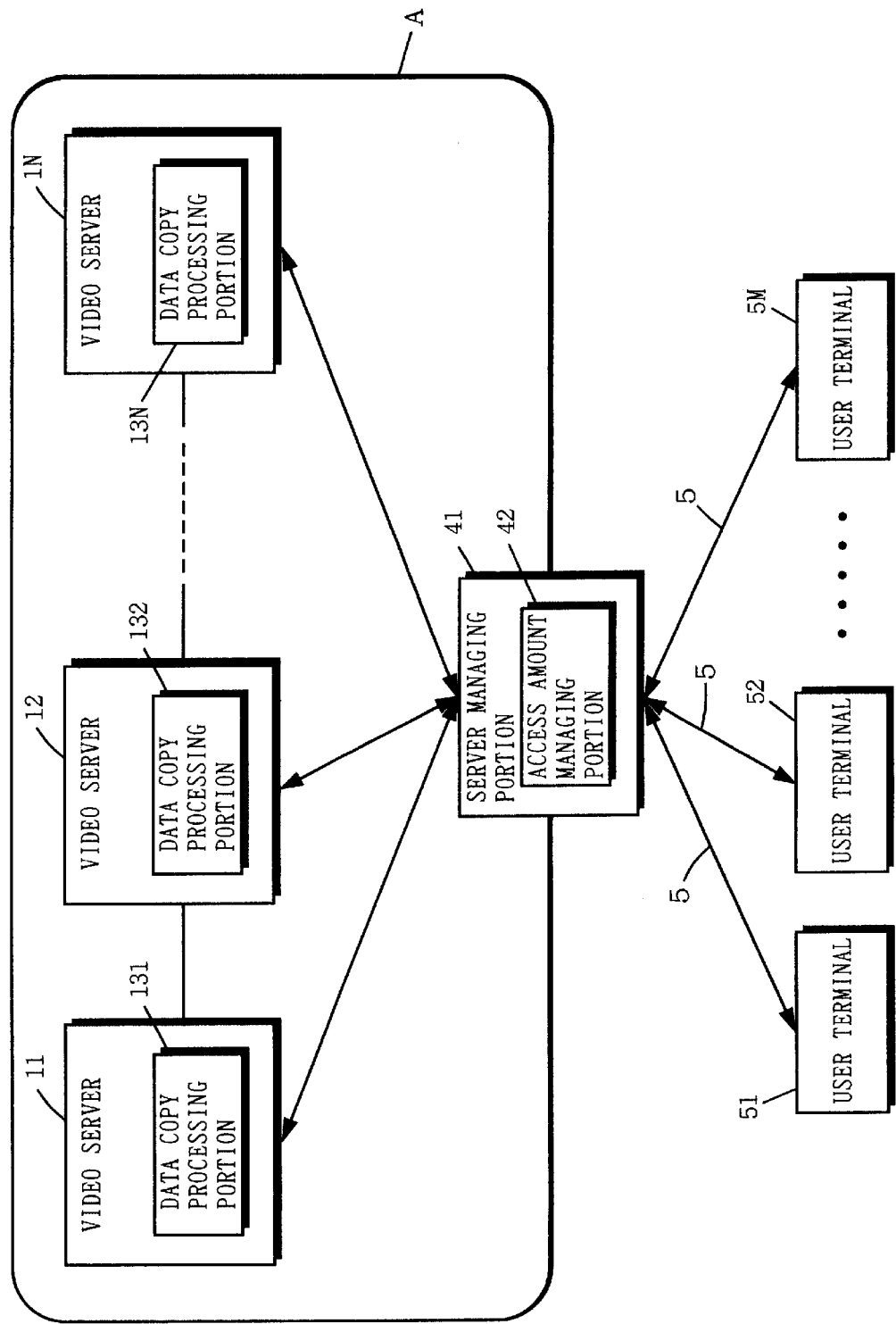
FIG. 9 is a block diagram showing the structure of a VOD service system according to a second embodiment of the present invention.

FIG. 9 is a diagram showing the structure of the VOD service system according to the second embodiment of the present invention. In FIG. 9, the VOD service system according to the second embodiment of the present invention is structured of a plurality of video servers 11 to 1N, a plurality of user terminals 51 to 5M, and a server managing portion 41. Further, the plurality of the video servers 11 to 1N include data copy processing portions 31 to 3N, respectively. The server managing portion 41 includes an access amount managing portion 42.

As in the above described first embodiment, the plurality of video servers 11 to 1N and the server managing portion 41 have various components. However, since they are not a main subject of the invention, their description is omitted herein.

Further, since all of the plurality of video servers 11 to 1N have the same structure, the following description is made mainly as to the video server 11.

The video server 11 stores and transmits data as required. Further, the video server 11 is interconnected to other video servers 12 to 1N through a LAN and the like, allowing an exchange of data among the video servers 11 to 1N. The plurality of user terminals 51 to 5M are connected through a network 5 to the server managing portion 41. The server managing portion 41 receives access from the plurality of user terminals 51 to 5M and makes instructions to the respective video servers 11 to 1N. The access amount managing portion 42 constantly manages the amount of access of each of the video servers 11 to 1N by information shown in FIG. 11, for example, to determine whether to perform expanding processing of the VOD service which will be described later. When the access amount managing portion 42 determines to perform the expanding processing, the data copy processing portion 31 copies data to the other video servers 21 to 1N in response to an instruction from the access amount managing portion 42.

Figure 10:
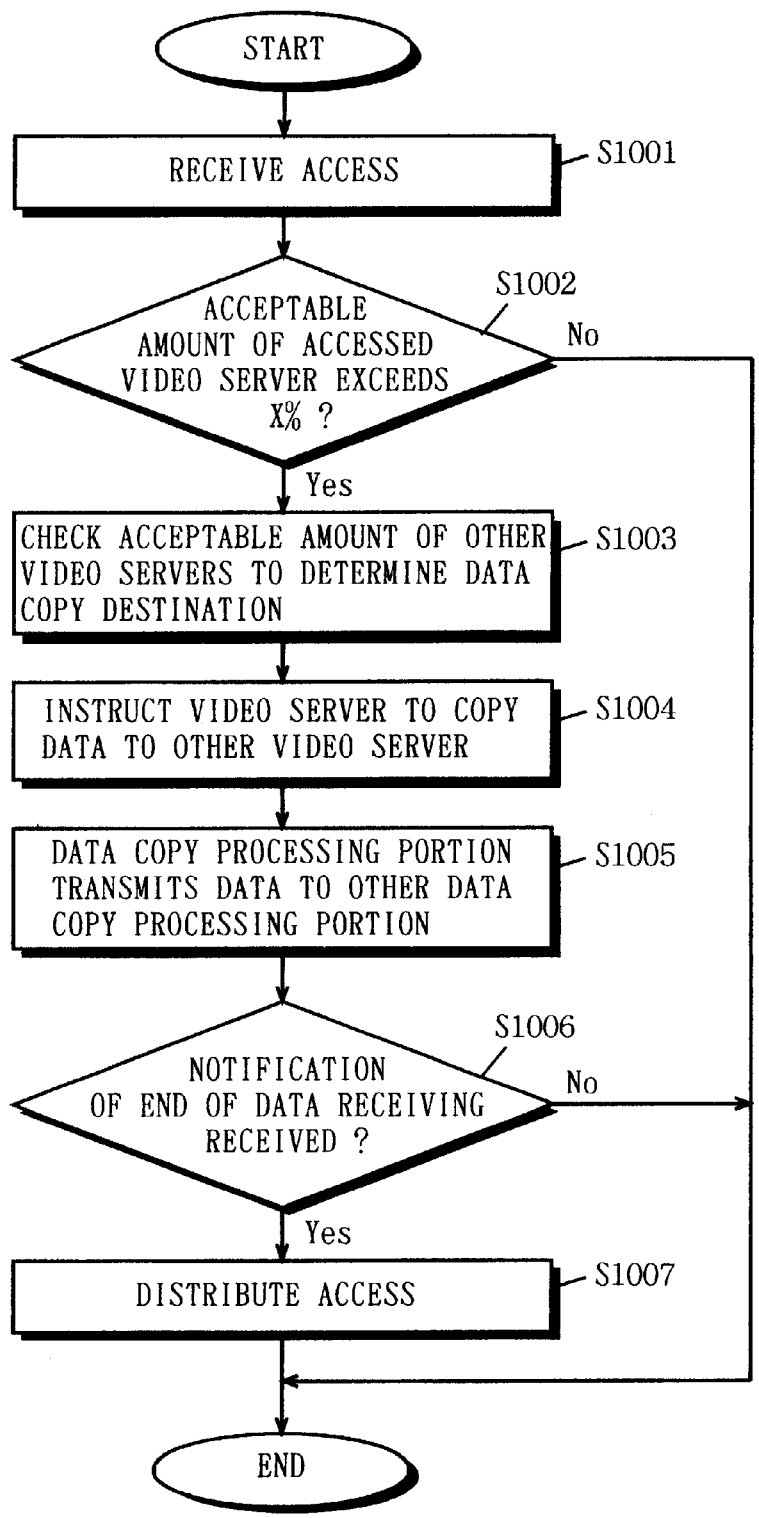
FIG. 10 is a flow chart showing a flow of expanding processing performed by a server managing portion 41 and the video servers 11 to 1N in FIG. 9.

Described below is an automatic expanding processing operation in the VOD service system with the above structure according to the second embodiment of the present invention using FIG. 10. FIG. 10 is a flow chart showing the expanding processing performed by the video servers 11 to 1N and the server managing portion 41 in the VOD service system. In the following description, the flow of the processing is shown in a case where the video server 11 performs the expanding processing to the video server 12, as an example.

The server managing portion 41 receives access from the user terminals 51 to 5M as normal (step S1001). The access amount managing portion 42 determines to which video server the received access is. Here, when determining that the access is to the video server 11, the access amount managing portion 42 next determines whether the total number of accesses in the video server 11 exceeds X% of an acceptable amount (step S1002). As a result of the determination in step S1002, when the total number of accesses exceeds X% of the acceptable amount, the access amount managing portion 42 checks each state of the access amount in the other video servers 12 to 1N to determine whether there is a video server to which the data may be copied (step S1003). Here, when it is determined that there is space for access in the video server 12, the server managing portion 41 gives the data copy processing portion 31 an instruction of copying the data to the data copy processing portion 32 (step S1004). Upon receiving the instruction, the data copy processing portion 31 copies the applicable data to the data copy processing portion 32 (step S1005).

After data copy ends in step S1005, the server managing portion 41 determines whether it is notified by the data copy processing portion 32 of an end of data receiving (step S1006). As a result of the determination in step S1006, when notified of an end of data receiving, the server managing portion 41 distributes access processing which should have been originally handled by the video server 11 to the video server 12 (step S1007). However, access distribution is not necessarily required, and depending on the setting of the above-mentioned X%, a method may be taken that the video server 12 of the data copy destination is made to first perform processing to access which is subsequently received.

On the other hand, when the total number of accesses does not exceed X% of the acceptable amount in step S1002 or when there is no notification of an end of data receiving from the video server 12 in step S1006, the access amount managing portion 42 does not perform access processing distribution, that is, the expanding process, and makes the video server 11 perform processing to the access as normal.

In step S1004, the number of other video servers of data copy destinations to which the server managing portion 41 instructs the video server 11 to copy data may be one, or two or more. Here, it is also possible to arbitrarily select a video server with a large amount of space and then make data copy thereto.

Further, in step S1006, the determination whether the server managing portion 41 is notified by the other video server 12 to 1N of an end of data receiving may be restricted by a lapse of time from data transmission (step S1005) and the like (refer to FIG. 7).

As described above, in the VOD service system according to the second embodiment of the present invention, the server managing portion 41 manages the access acceptable amount of all of the video servers 11 to 1N in the station A. Thus, the server managing portion 41 previously determines whether there is no problem if the received access is given to the video server as it is, and then, if required, distributes data copy and the access processing to the video server of the data copy destination.

Therefore, the VOD service in accordance with the second embodiment can previously and quickly avoid problems such as that the video servers 11 to 1N are overworked to reject access.

As described above, the VOD service system according to the first and second embodiments of the present invention improves expandability of the VOD service system in the station A structured of one LAN and the like to realize the making available of a comfortable VOD service to more users.

Figure 12:
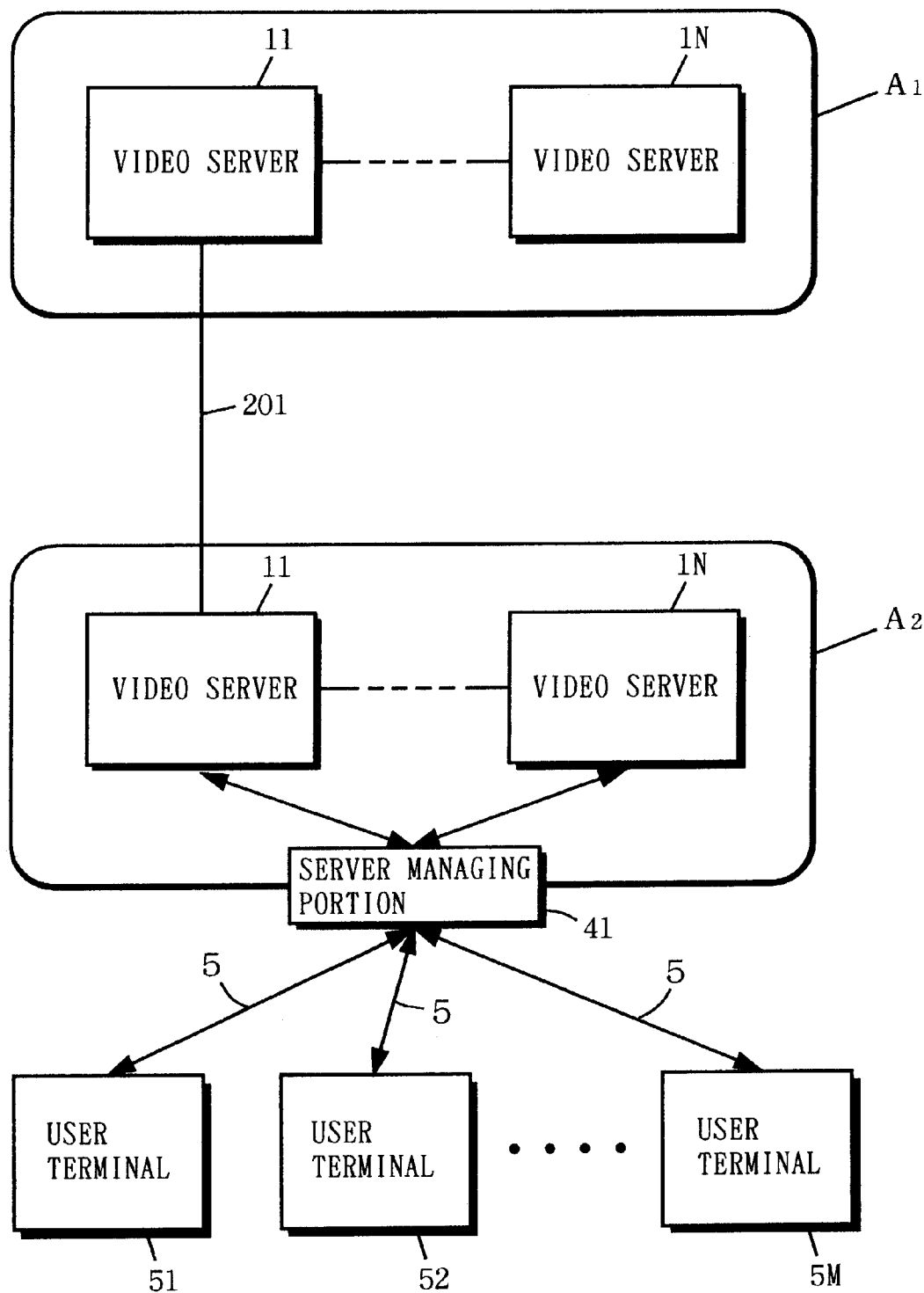
FIG. 12 is a diagram showing the structure of the VOD service system when a plurality of stations are connected through a network 201.

However, it is possible to perform the automatic expanding processing according to the present invention between a station A1 and a station A2, as shown in FIG. 12. That is, in FIG. 12, it can be thought that the user terminals 51 to 5M connected though the network 5 and the server managing portion 41 to the station A2 make a request for access to data existing in the video server 11 structured in the station A1. In this case, for example, the video server 11 in the station A2 makes access through a network 201 to the video server 11 in the station A1, and when the access amount of the video server 11 in the station A1 exceeds X%, the video server 11 in the station A1 can perform the above described expanding processing to each of the video servers 11 to 1N in the station A2.

(Third embodiment)

A third embodiment of the present invention is a VOD service system of improving expandability of title information among server managing portions.

Figure 13:
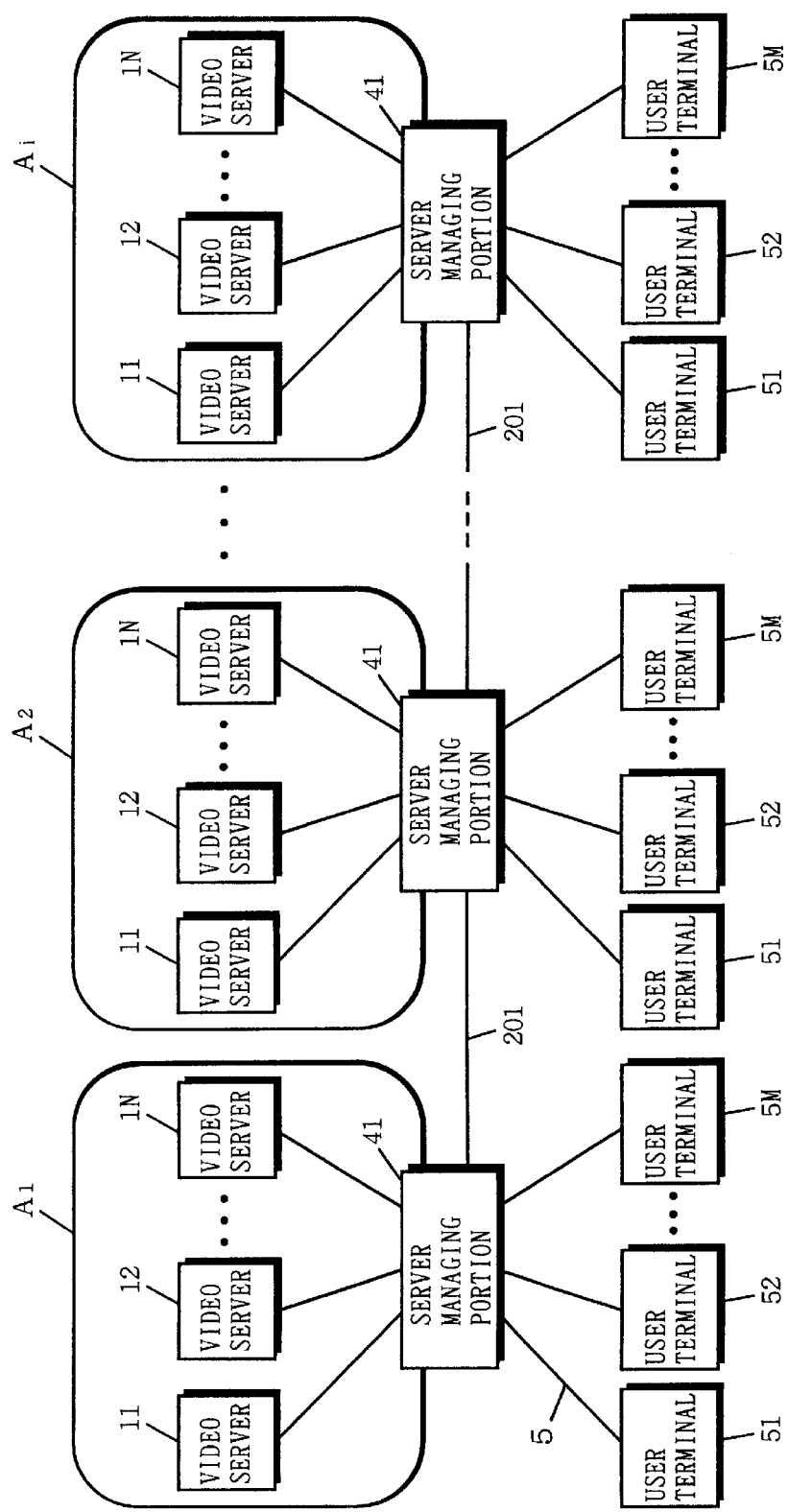
FIG. 13 is a block diagram showing a VOD service system according to third and fourth embodiments of the present invention.

FIG. 13 is a block diagram showing the structure of the VOD service system of the third embodiment of the present invention. In FIG. 13, the VOD service system according to the third embodiment of the present invention is structured of a plurality of stations A1 to Ai and a plurality of user terminals 51 to 5M. Further, each of the stations A1 to Ai is structured of a plurality of video servers 11 to 1N and a server managing portion 41.

Practically, in addition to the above components, the plurality of video servers 11 to 1N have various components such as a write processing portion for storing data, a read processing portion for transmitting data requested by a user, a control portion for controlling transmission timing, and the like. However, since they are not a main subject of the invention, their description is omitted herein.

Further, practically, the server managing portion 41 has various components such as a read processing portion for requesting the video server to transmit a title requested by a user and the like. However, since they are not a main subject of the invention, their description is omitted herein.

Further, all of the video servers 11 to 1N have the same structure, and the stations A1 to Ai have basically the same structure except that the number of video servers may be different. Therefore, the following description is made mainly as to the station A1 and the video server 11.

The video servers 11 to 1N each stores data. The video servers 11 to 1N are connected through a LAN and the like to the server managing portion 41. The server managing portion 41 mediates between the video servers 11 to 1N and the user terminals 51 to 51M, and manages title information which is information as to a title of a data item stored in the video servers 11 to 1N, storage locations and the like, for example, title information as shown in FIG. 17. The user terminals 51 to 5M are connected through a network 5 to the server managing portion 41. Further, the station A1 is connected through a network to other stations A2 to Ai.

Figure 14:
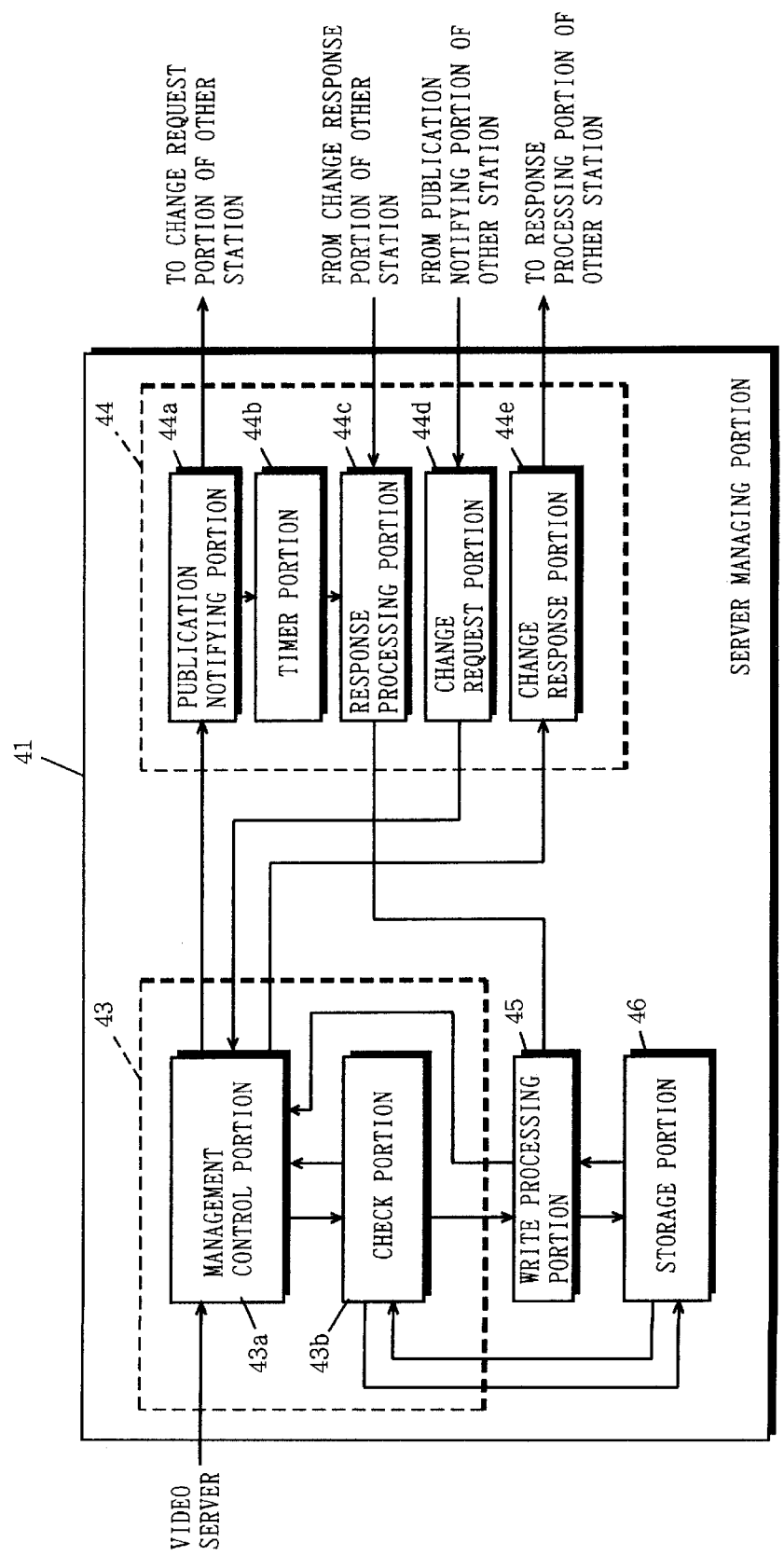
FIG. 14 is a block diagram showing the structure of a server managing portion 41 in FIG. 13.

Further, FIG. 14 is a block diagram showing the internal structure of the server managing portion 41 in FIG. 13. In FIG. 14, the server managing portion 41 includes a title managing portion 43, a title publication processing portion 44, a write processing portion 45, and a storage portion 46. The title managing portion 43 includes a management control portion 43a and a check portion 43b. The title publication processing portion 44 includes a publication notifying portion 44a, a timer portion 44b, a response processing portion 44c, a change request portion 44d, and a change response portion 44e.

In the title managing portion 43, the management control portion 43a receives a change request of the title information from the video servers 11 to 1N in its own station. The check portion 43b checks the state in the storage portion 46.

In the title publication processing portion 44, the publication notifying portion 44a transmits change notification of requesting the server managing portion 41 in the other station for change. The timer portion 44b counts a prescribed time. The response processing portion 44c receives a response returned from the server managing portion 41 in the other station. The change requesting portion 44d receives change notification transferred from the publication notifying portion 44a. The change response portion 44e returns a response to the change notification to the other station.

Figure 15:
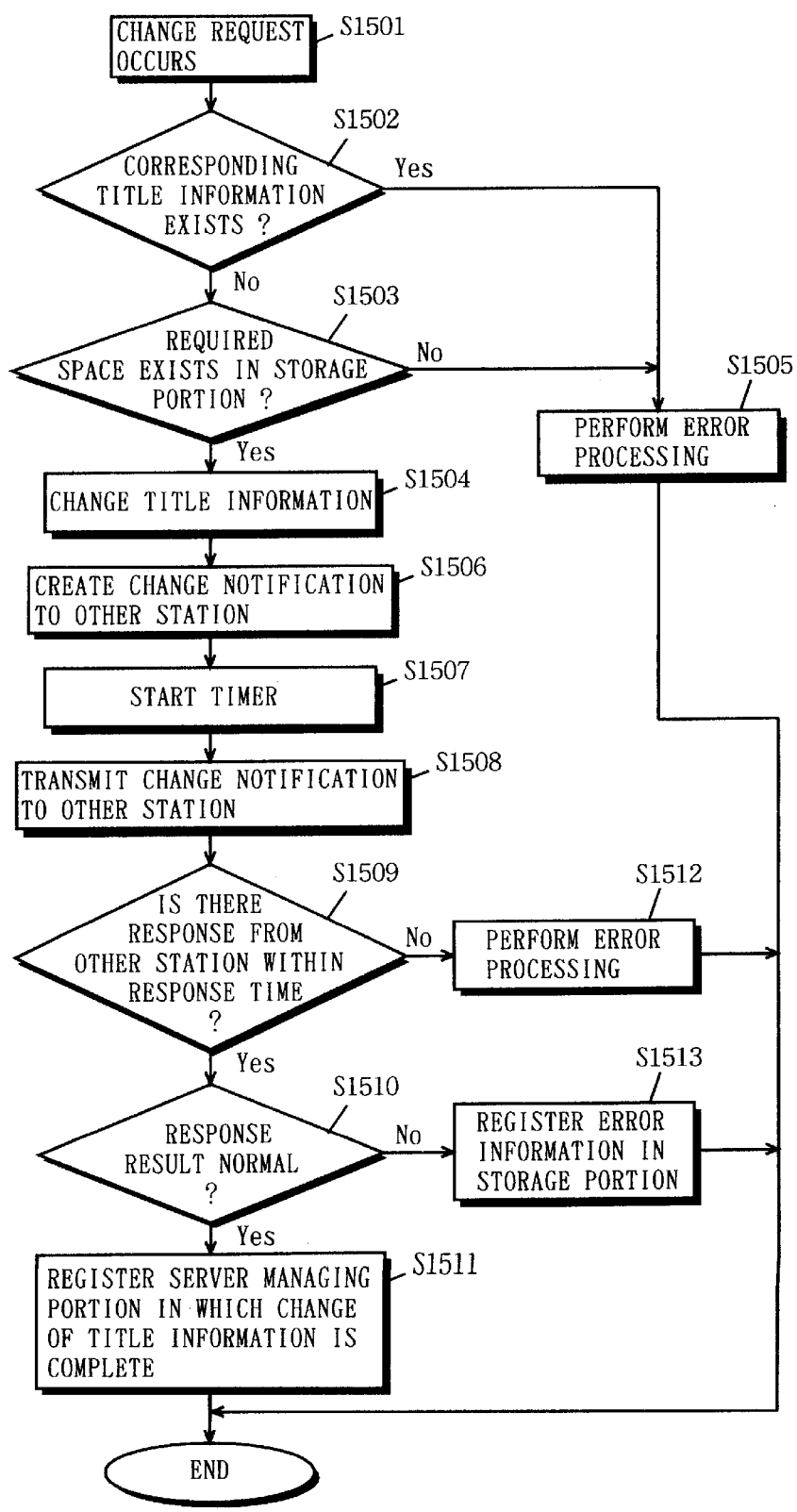
FIG. 15 is a flow chart showing a flow of expanding processing which the server managing portion 41 in FIG. 14 performs when there is a change in its own station.
Figure 16:
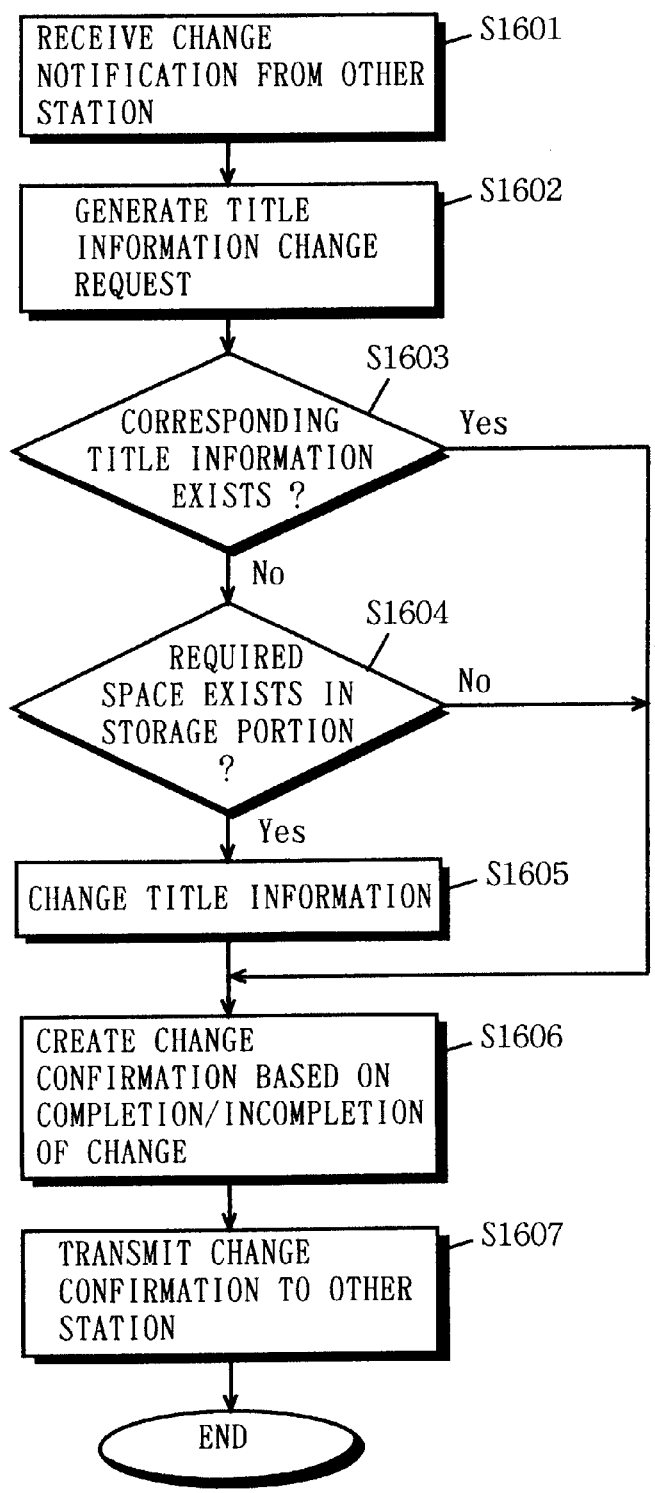
FIG. 16 is a flow chart showing a flow of expanding processing which the server managing portion 41 in FIG. 14 performs when there is a change in another station.

Described below is an expanding processing operation performed by the server managing portion 41 in the VOD service system structured as in the above according to the third embodiment of the present invention, further referring to FIG. 15 and FIG. 16. FIG. 15 is a flow chart showing expanding processing of the server managing portion when there is a change such as an addition/deletion in the video server of its own station. FIG. 16 is a flow chart showing expanding processing of the server managing portion when there is a change such as an addition/deletion in the video server of the other station.

In the following description, a flow of processing is shown in a case where there is a change such as an addition/deletion in the video server 11 of the station A1 and the expanding processing is performed to the station A2, for example.

First, referring to FIG. 14 and FIG. 15, described is expanding processing of the server managing portion 41 in the station A1 when there is a change such as an addition/ deletion in the video server 11 of the station A1.

When a new data item is added or a stored data item is deleted in the video server 11 in the station A1, the video server 11 notifies the server managing portion 41 of its own station A1 which manages the title information of the contents of addition or deletion to make a request for changing the title information (step S1501).

The management control portion 43a notifies the check portion 43b of the contents of the change request received from the video server 11 of its own station A1. Next, the check portion 43b determines whether the title information requested to be changed already exists in the storage portion 46 (step S1502). As a result of the determination in step S1502, when the title information does not exist in the storage portion 46, the check portion 43b further determines whether space required for changing the title information exists in the storage portion 46 (step S1503). As a result of the determination in step S1503, when required space exists in the storage portion 46, the check portion 43b notifies the write processing portion 45 of write permission. On receiving the permission, the write processing portion 45 changes the title information in the storage portion 46 (step S1504).

On the other hand, as a result of the determination in step S1502, when the title information already exists in the storage portion 46, or as a result of the determination in step S1503, when required space does not exist in the storage portion 46, the check portion 43b determines abnormality to perform error processing (step S1505).

When change of the title information in the storage portion 46 ends in step S1504, the management control portion 43a requests the publication notifying portion 44a in the title publication processing portion 44 to notify the server managing portion 41 of the other station A2 connected through the network of change of the title information. Upon receiving the request from the management control portion 43a, the publication notifying portion 44a creates change notification of the title information to the server managing portion 41 of the other station A2 connected through the network (step S1506). Next, the publication notifying portion 44a starts counting a predetermined response time using the timer portion 44b (step S1507), and then transmits the created change notification to the change requesting portion 44d in the server managing portion 41 of the other station A2 (step S1508).

Then, the response processing portion 44c determines whether normal response notification from the other station A2 described later arrives within the response time counted by the timer portion 44b (steps S1509 and S1510). In these steps S1509 and S1510, when normal response notification arrives within the above-mentioned response time, the response processing portion 44c notifies the write processing portion 45 that change of the above title information is complete in the server managing portion 41 of the other station A2. Then, based on the notification, the write processing portion 45 registers in the storage portion 46 that change of the above title information is complete in the server managing portion of the other station A2 (step S1511).

On the other hand, in steps S1509 and S1510, when no response notification arrives or the notification is abnormal, it is determined that change of the above-mentioned title information is not complete in the server managing portion 41 of the other station A2 which returns the response notification (steps S1512 and S1513).

In this case, for example, at the time of retransmission at time intervals or next occurrence of change of another title information, necessary information is preferably registered in the storage portion 46 so that notification of this change of another title information together with change of the title information which could not be done this time can be provided.

Registration of the results based on the response notification in step S1511 described above is not necessarily required, and it may be possible to register the results only when the response notification is normal or abnormal.

Described next is expanding processing of the server managing portion 41 of the other station A2 when there is a change such as addition/deletion in the video server of the station A1, reffering to FIG. 14 and FIG. 16.

As described above, the publication notifying portion 44a in the station A1 having the video server 11 in which the title information has been changed transmits change notification. In response, in the server managing portion 41 of the station A2, the change request portion 44d receives the change notification transmitted from the station A1 (step S1601). Based on the received change notification, the change request portion 44d requests the management control portion 43a to change the title information (step S1602).

The management control portion 43a notifies the check portion 43b of the contents of the change request received from the change request portion 44d. The check portion 43b next determines whether the title information requested to be changed already exists in the storage portion 46 (step S1603). As a result of the determination in step S1603, when the title information does not exist in the storage portion 46, the check portion 43b further determines whether space required for changing the title information exists in the storage portion 46 (step S1604). As a result of the determination in step S1604, when the required space exists in the storage portion 46, the check portion 43b notifies the write processing portion 45 of write permission. Upon receiving the notification, the write processing portion 45 changes the title information in the storage portion 46 (step S1605).

Here, the management control portion 43a notifies the change response portion 44e of completion when the title information has been changed, while incompletion when the title information has not been changed (when the tile information exists in the storage portion 46 in the determination in step S1603 or when required space does not exist in the storage portion 46 in the determination in step S1604). Then, the change response portion 44e creates change confirmation based on the notification (step S1606), and transmits the change confirmation to the server managing portion 41 in the station A1 of a destination of the change notification (step S1607).

FIGS. 18a to 18c and 18a' to 18c' are screen examples showing changes of title menu screens (hereinafter referred to as a menu screen G1 and a menu screen G2) displayed by the server managing portion 41 when the above series of processing is performed.

FIGS. 18a and 18a' are the menu screen G1 and the menu screen G2 before a data item is added, a stored data item is deleted or the like in the video server 11, showing a title A and a title B. Here, for example, when the title B is deleted and a title C and a title D are added in the video server 11 of the station A1, the menu screen G1 is changed as shown in FIG. 18b (the titles A, C, and D are displayed), while at this stage the menu screen G2 still displays the original titles A and B as shown in FIG. 18b'. Next, when the server managing portion 41 of the station A1 notifies the server managing portion 41 of the station A2 connected through the network 201 of change of the title information as to the added/deleted data items to change the title information, the state of the menu screen G2 becomes such that the titles A, C, and D are displayed as shown in FIG. 18c'.

Therefore, the change of the video server of the other station is reflected in the server managing portions 41 of all stations, and it is thus possible to provide the updated title information as a title menu selectable by a user.

As described above, the VOD service system according to the third embodiment of the present invention, also notifies the other station which does not directly manage the video server of the contents of change of data addition/deletion performed in a video server of a specific station.

Therefore, according to the VOD service system in accordance with the third embodiment, it is possible to provide the updated new title information also for a user terminal connected to the other station, and thereby provide a comfortable VOD service for the user.

In the above third embodiment, the title managing portion 43 has the structure including the management control portion 43a. However, the present invention is not restricted to such structure, and, for example, it is possible to provide a structure for receiving a change request independently in a case where the change request is received from a video server of its own station and in a case where the change request is received from a video server of the other station.

Further, in the above third embodiment, described is a case where the server managing portion of a station in which change is to be made transmits change notification to the server managing portions of all of the other stations connected through a network. However, the present invention is not restricted to this transmission method, and it may be possible to transmit notification like a chain from a server managing portion in one of the other stations which received the change notification to a server managing portion in another one of the other stations.

Furthermore, in the above third embodiment, described is the VOD service system where a station is structured of a video server for storing data and a server managing portion including a title managing portion and a title publication processing portion. However, the present invention is not restricted to this structure, and it is possible to take a structure in which a server managing portion is not provided but a specific video server composing a specific station includes a title managing portion and a title publication processing portion, and also it is possible to structure the VOD system including stations with both of the above structures.

(Fourth embodiment)

A fourth embodiment of the present invention is a VOD service system which improves data expandability among video servers as described in the first and second embodiments and also improves title information expandability among server managing portions as described in the third embodiment. The fourth embodiment of the present invention produces new effects described below by simultaneously improving both expandabilities.

Although the structure of the VOD service system according to the fourth embodiment of the present invention is the same as that of the VOD service system according to the above described third embodiment shown in FIG. 13, the video servers 11 to 1N in FIG. 13 includes the functions (the access amount managing portions 21 to 2N and the data copy processing portions 31 to 3N) described in the above first embodiment (or the second embodiment) (not shown).

Further, since the data and title information expanding processing has been described in the above first to third embodiments, its description is omitted herein.

New effects produced by the VOD service system according to the fourth embodiment are that when an arbitrary video server is out of order (disk failure, erroneous deletion of data, and the like), it is possible to automatically restore the video server.

However, as a precondition, data stored in the out-of-order video server is copied to at least one another video server by expanding processing before the failure.

Figure 19:
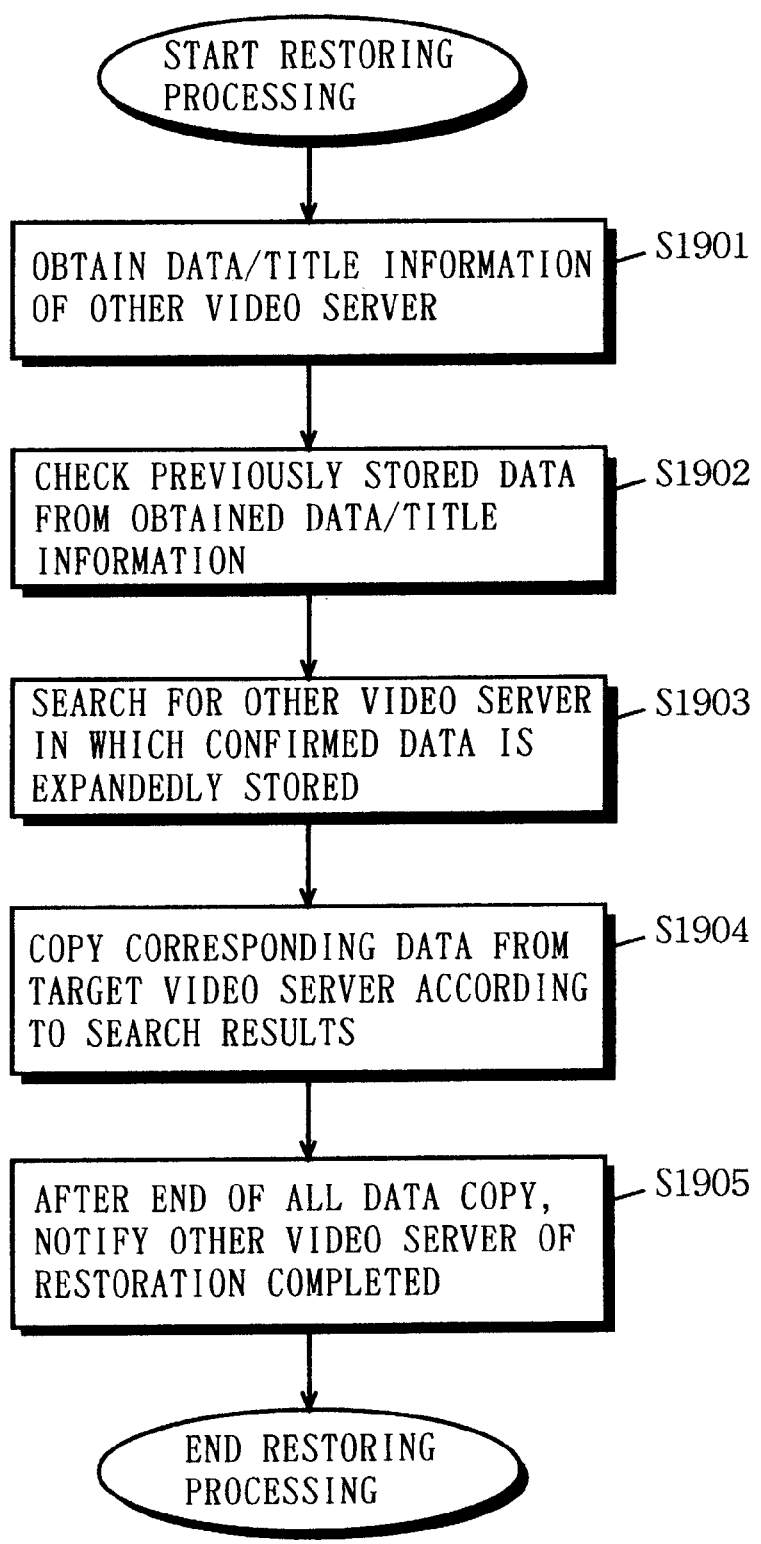
FIG. 19 is a flow chart showing a flow of restoring processing of the video server performed by the VOD service system according to the fourth embodiment of the present invention.

Described below in sequence is a restoring method of the video server referring to FIG. 19. FIG. 19 is a flow chart showing restoring processing performed in the VOD service system according to the fourth embodiment In the following description, a flow of the restoring processing is shown in a case where the contents of the video server 12 of the station A1 are deleted in error, as an example.

As a matter of course, each server managing portion 41 in the stations A1 to Ai has various information (hereinafter referred to as data/title information) as shown in FIG. 20, for example, by the data and title information expanding processing described in the first to third embodiments.

When the restoring processing of the video server 12 of the station A1 starts, the video server 12 first obtains data/title information of another arbitrary video server connected through the network 201 (step S1901). Here, the reason why an obtaining source is taken as another arbitrary video server is that the same data/title information exists in each video server, as described above.

The video server 12 of the station A1 then checks from the obtained data/title information what type of data was stored in the previous video server 12 (that is, before failure) (step S1902). In an example shown in FIG. 20, it is confirmed that a movie X (address 001), a sport Y (address 002), a drama Z (address 004) and the like existed.

Further, the video server 12 of the station A1 searches to find in which other video server each data item confirmed in step S1902 is expandedly stored (step S1903). In the example in FIG. 20, as a result of searches, it is found that the movie X is located at the address 003 in the video server 13 of the station A1 and the drama Z is located at the address 004 in the video server 11 of the station A1. As a matter of course, although not shown, the sport Y and the like are stored in the other video servers.

Then, after ending the above searches, the video server 12 of the station A1 copies the corresponding data to its own storage area from the target video server according to the search results (step S1904). This copy is preferably performed as appropriate by constantly determining the access state of users so as not to have an effect on a presently performed service. Then, the video server 12 of the station A notifies the other video server of complete restoration of the video server when all of the corresponding data items have been copied (step S1905).

As described above, the VOD service system according to the fourth embodiment of the present invention includes both of the function of data expanding processing and the function of title information expanding processing.

Therefore, according to the VOD service system in accordance with the fourth embodiment, it is possible to automatically perform restoring processing if an arbitrary video server is out of order.

Typically, each function in the VOD service system according to the above first to fourth embodiments is realized by a storage device (ROM, RAM, a hard disk and the like) storing prescribed computer program data and a CPU (central processing unit) for executing the computer program data. In this case, each computer program data item may be introduced through a recording medium such as a CD-ROM, a floppy disk and the like.

While the invention has been described in detail, the foregoing description is in all aspects illustrative and not restrictive. It is understood that numerous other modifications and variations can be devised without departing from the scope of the invention.

What is claimed is:

1. A video on demand service system for receiving access from user terminals and providing data stored in video servers for the user terminals, said system comprising:
   a plurality of said video servers and a plurality of said user terminals connected through a network;
   each of said video servers comprising:
      managing means for managing an amount of the access from said user terminals;
      determining means by dynamically determining whether or not the amount of the access currently managed by said managing means exceeds a predetermined amount which is less than an amount of access which overworks said video server;
      copying means for copying specific data to at least one other of said video servers which has space for an other access when said determining means determines that the amount of the access exceeds the predetermined amount; and
      distributing means for distributing a processing of currently receiving/subsequently receiving access for the specific data to the at least one other of said video servers.

2. A video on demand service system for receiving access from user terminals and providing data stored in video servers for the user terminals, said system comprising:
   a plurality of said video servers and a plurality of said user terminals connected through a network;
   each of said video servers comprising:
      managing means for managing an amount of the access from said user terminals;
      determining means for dynamically determining whether or not the amount of the access currently managed by said managing means exceeds a predetermined amount which is less than an amount of access which overworks said video server;
      copying means for copying specific data to at least one other of said video servers which has space for an other access according to the size of the space from large to small when said determining means determines that the amount of the access exceeds the predetermined amount; and
      distributing means for distributing a processing of currently receiving/subsequently receiving access for the specific data to the at least one other of said video servers.

3. A video on demand service system for receiving access from user terminals and providing data stored in video servers for the user terminals, said system comprising:
   a plurality of said video servers and a plurality of said user terminals connected through a network;
   each of said video servers comprising:
      managing means for managing an amount of the access from said user terminals;
      determining means for dynamically determining whether or not the amount of the access currently managed by said managing means exceeds a predetermined amount which is less than an amount of access said overworks said video server;
      monitoring means for monitoring an amount of an other access which is currently managed by an other of said managing means;
      copying means for copying specific data to at least one other of said video servers which has space for an other access, in accordance with the amount of the other access which is currently monitored by said monitoring means, when said determining means determines that the amount of the access exceeds the predetermined amount; and
      distributing means for distributing a processing of currently receiving/subsequently receiving access for the specific data to the at least one other of said video servers.

4. A video on demand service system for receiving access from user terminals and providing data stored in video servers for the user terminals, said system comprising:

a plurality of said video servers and a plurality of said user terminals connected through server managing means by a network, said server managing means comprising managing means for instructing at least one of said video servers relating to an access received from said user terminals and managing an amount of all the access of said video servers;

each of said video servers comprising:

determining means for dynamically determining whether or not the amount of the access currently managed by said managing means exceeds a predetermined amount which is less than an amount of access which overworks said video server;

copying means for copying specific data to at least one other of said video servers which has space for an other access, in accordance with the amount of the other access which is currently managed by said server managing means, when said determining means determines that the amount of the access exceeds the predetermined amount;

distributing means for distributing a processing of currently receiving/subsequently receiving access processing for the specific data to the at least one other of said video servers.

5. A video on demand service system as claimed in claim 1, wherein said determining means and said copying means transmit notification of a request for copy permission of the specific data to the at least one other of said video servers, and further receives a response of copy permission or prohibition to the notification from the at least one other of said video servers to determine whether it is possible to copy the specific data.

6. A video on demand service system as claimed in claim 2, wherein said determining means and said copying means transmit notification of a request for copy permission of the specific data to the at least one other of said video servers, and further receives a response of copy permission or prohibition to the notification from the at least one other of said video servers to determine whether it is possible to copy the specific data.

7. A video on demand service system as claimed in claim 5, wherein said determining means and said copying means does not copy the specific data when the response to the notification does not arrive after a lapse of a predetermined time from transmission of the notification of the request for copy permission.

8. A video on demand service system as claimed in claim 6, wherein said determining means and said copying means does not copy the specific data when the response to the notification does not arrive after a lapse of a predetermined time from transmission of the notification of the request for copy permission.

9. A video server for use in a video on demand service system for receiving access from user terminals and then providing corresponding data to the user terminals, said video server comprising:

managing means for managing an amount of the access from the user terminals;

determining means for dynamically determining whether or not the amount of the access currently managed by said managing means exceeds a predetermined amount which is less than an amount of access which overworks said video server;

copying means for copying specific data to at least one other video server which has space for an other access when said determining means determines that the amount of the access exceeds the predetermined amount; and distributing means for distributing a processing of currently receiving/subsequently receiving access for the specific data to the at least one other video server.

10. A video server for use in a video on demand service system for receiving access from user terminals and then providing corresponding data to the user terminals, said video server comprising:

managing means for managing an amount of the access from the user terminals;

determining means for dynamically determining whether or not the amount of the access currently managed by said managing means exceeds a predetermined amount which is less than an amount of access which overworks said video server;

copying means for copying specific data to at least one other video server which has space for an other access according to the size of the space from large to small when said determining means determines that the amount of the access exceeds the predetermined amount; and distributing means for distributing a processing of currently receiving/subsequently receiving access for the specific data to at least one other of said video servers.

11. A video on demand service system as claimed in claim 9, wherein said determining means and said copying means transmit notification of a request for copy permission of the specific data to the at least one other of said video server, and further receives a response of copy permission or prohibition to the notification from the at least one other of said video server to determine whether it is possible to copy the specific data.

12. A video on demand service system as claimed in claim 10, wherein said determining means and said copying means transmit notification of a request for copy permission of the specific data to the at least one other of said video server, and further receives a response of copy permission or prohibition to the notification from the at least one other of said video server to determine whether it is possible to copy the specific data.

13. A video on demand service system as claimed in claim 11, wherein said determining means and said copying means does not copy the specific data when the response to the notification does not arrive after a lapse of a predetermined time from transmission of the notification of the request for copy permission.

14. A video on demand service system as claimed in claim 12, wherein said determining means and said copying means does not copy the specific data when the response to the notification does not arrive after a lapse of a predetermined time from transmission of the notification of the request for copy permission.

15. A data processing method in a video on demand service system in which a plurality of video servers and a plurality of user terminals are connected through a network, the system for receiving access from the user terminals and then providing data stored in the video server for the user terminals, said method comprising:

managing an amount of the access from the user terminals;

dynamically determining whether or not the amount of the access currently managed by said managing exceeds a predetermined amount which is less than an amount of access which overworks the video server;

making a request for copy permission of specific data to at least one other video server when it is determined in said managing that the amount of the access exceeds a predetermined amount;

copying the specific data to at least one other video server which has space for an other access when said determining determines that the amount of the access exceeds the predetermined amount; and distributing a processing of currently receiving/ subsequently receiving access for the specific data to the at least one other video server.

16. A data processing method as claimed in claim 15, wherein said copying does not copy the specific data when the response to the request does not arrive after a lapse of a predetermined time from transmission of the request for the copy permission.

17. A computer program embodied on a computer readable medium for use with a video on demand service system in which a plurality of video servers and a plurality of user terminals are connected through a network, the system for receiving access from the user terminals and then providing data stored in the video server for the user terminals, said computer program comprising:

computer readable program code means for causing the video on demand system to manage an amount of access from the user terminals;

computer readable program code means for causing the video on demand system to dynamically determine whether or not the amount of the access currently managed exceeds a predetermined amount which is less than an amount of access which overworks the video server;

computer readable program code means for causing the video on demand system to make a request for copy permission of specific data to at least one other video server when it is determined in the managing that the amount of the access exceeds a predetermined amount;

computer readable program code means for causing the video on demand system to copy the specific data to at least one other video server which has space for an other access when the determining determines that the amount of the access exceeds the predetermined amount; and computer readable program code means for causing the video on demand system to distribute a processing of currently receiving/subsequently receiving access for the specific data to the at least one other video server.

18. A computer program embodied on a computer readable medium as claimed in claim 17, wherein the copying does not copy the specific data when the response to the request does not arrive after a lapse of a predetermined time from transmission of the request for the copy permission.

\* \* \* \* \*